(12) United States Patent
Kitamura et al.

(10) Patent No.: US 8,258,653 B2
(45) Date of Patent: Sep. 4, 2012

(54) CONTACTLESS POWER TRANSMISSION SYSTEM

(75) Inventors: Hiroyasu Kitamura, Hirakata (JP); Tomohiro Ota, Takarazuka (JP); Seiichi Iwao, Inukami (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 12/690,218

(22) Filed: Jan. 20, 2010

(65) Prior Publication Data

US 2010/0187912 A1    Jul. 29, 2010

(30) Foreign Application Priority Data

Jan. 27, 2009  (JP) ................................. 2009-015988
Jun. 25, 2009  (JP) ................................. 2009-150586

(51) Int. Cl.
*H01F 27/42* (2006.01)
*H01F 37/00* (2006.01)
*H01F 38/00* (2006.01)

(52) U.S. Cl. ..................... 307/104; 340/572.1; 340/571; 340/568.1

(58) Field of Classification Search .................. 307/104; 331/177 R–177 V; 320/108; 340/572.1, 340/568.1, 571

See application file for complete search history.

(56) References Cited

U.S. PATENT DOCUMENTS

| 2006/0202665 A1* | 9/2006 | Hsu ............................. 320/139 |
| 2008/0231120 A1 | 9/2008 | Jin |
| 2009/0206791 A1* | 8/2009 | Jung ............................ 320/108 |

FOREIGN PATENT DOCUMENTS

| JP | 2004-229406 |   | 8/2004 |
| JP | 2004229406 | * | 8/2004 |
| JP | 2006-81249 |   | 3/2006 |
| WO | 2008/002164 |   | 1/2008 |

* cited by examiner

*Primary Examiner* — Rexford Barnie
*Assistant Examiner* — Toan Vu
(74) *Attorney, Agent, or Firm* — Greenblum & Bernstein, P.L.C.

(57) ABSTRACT

Power saving is promoted by oscillating only power transmission coil contributing to contactless charging without using any communication means.

19 Claims, 25 Drawing Sheets

CONTACTLESS POWER TRANSMISSION SYSTEM

BACKGROUND OF THE INVENTION AND RELATED ART STATEMENT

1. Field of the Invention

The present invention relates to a contactless power transmission system provided with a power transmitting device including power transmission coils for transmitting power and a power receiving device including a power receiving coil to be magnetically coupled to the power transmission coils.

2. Description of the Related Art

In recent years, there has been known a contactless power transmission system which enables the enlargement of the area of a placing portion and the charging of the power receiving device regardless of at which position of the placing portion the power receiving device is placed by arranging a plurality of coils below the placing portion, on which a power receiving device is to be placed.

For example, patent literature 1 (JP-A 2006-81249) discloses a charging system in which a plurality of power transmission coils and a plurality of communication means are arranged in a desktop mat, the placed position of a notebook PC is detected from the arranged position of the communication means that could communicate with the notebook PC placed on the desktop mat, and power is applied to the power transmission coil located at the placed position.

Further, patent literature 2 (JP-A 2004-229406) discloses a charging system in which a plurality of coils are arranged below a coupling surface of a secondary device, a magnetic field with a magnetic path moving or rotating in the coupling surface is formed by causing currents of different phases to flow into the respective coils, so that power can be transmitted to the secondary device regardless of at which position on the coupling surface the secondary device is placed.

However, since the communication means are used to detect the placed position of the notebook PC in patent literature 1, there is a problem of complicating the system and increasing the cost. Although the magnetic field is so formed that the magnetic path moves or rotates in the coupling surface in patent literature 2, the coils at positions where the secondary device is not placed are also driven since all the coils arranged below the coupling surface are driven. As a result, there is a problem of being unable to promote power saving.

SUMMARY OF THE INVENTION

An object of the present invention is to provide a contactless power transmission system capable of promoting power saving by oscillating only power transmission coils contributing to contactless charging without using any communication means.

One aspect of the present invention is directed to a contactless power transmission system, comprising a power transmitting device including power transmission coils for transmitting power, and a power receiving device including a power receiving coil to be magnetically coupled to the power transmission coils, wherein the power transmitting device includes a placing portion, on which the power receiving device is to be placed, a plurality of power transmission coils arranged below the placing portion, an oscillator for oscillating the respective power transmission coils while separately exciting them, a detector for detecting the inductances of the respective power transmission coils, and a determiner for determining the placed position of the power receiving device on the placing portion based on the inductances of the respective power transmission coils detected by the detector; and the oscillator specifies a plurality of power transmission coils to be oscillated based on the placed position determined by the determiner and sets parameters of currents to flow into the respective power transmission coils so as to mutually shift the waveforms of currents to flow into the plurality of specified power transmission coils.

These and other objects, features and advantages of the present invention will become more apparent upon a reading of the following detailed description. Further, advantages of the present invention will become more apparent in the following description with reference to accompanying drawings.

DETAILED DESCRIPTION OF THE PREFERRED EMBODIMENTS OF THE INVENTION

The invention is now described, by way of examples, with reference to the accompanying drawings.

First Embodiment

Figure 1A:
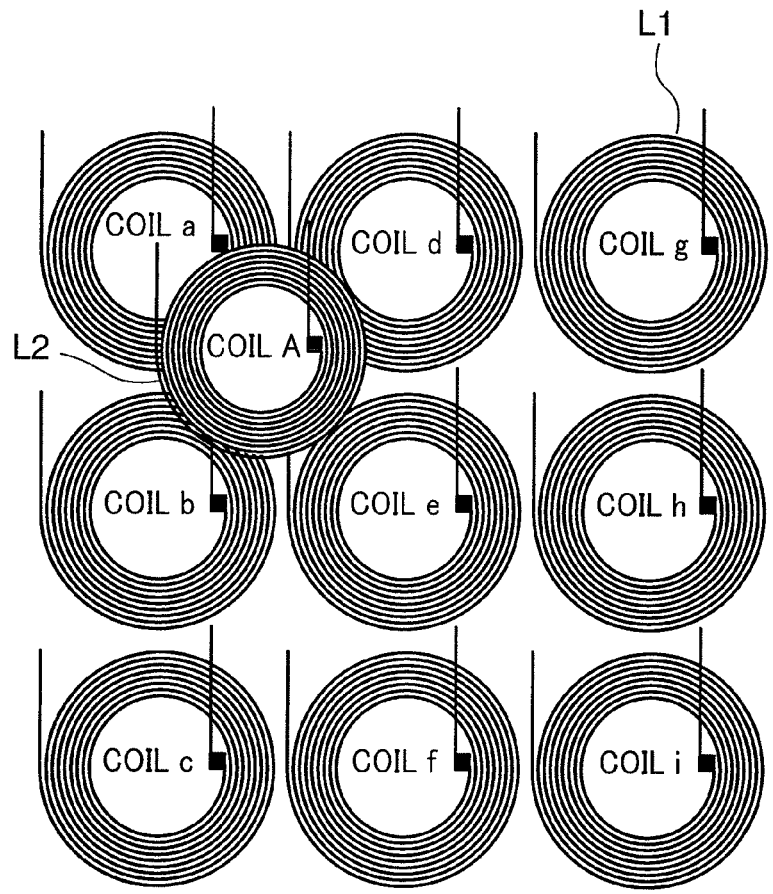
FIG. 1A is an arrangement diagram of power transmission coils of a contactless power transmission system according to a first embodiment of the invention and FIG. 1B is a side view of the contactless power transmission system according to the first embodiment of the invention.
Figure 1B:
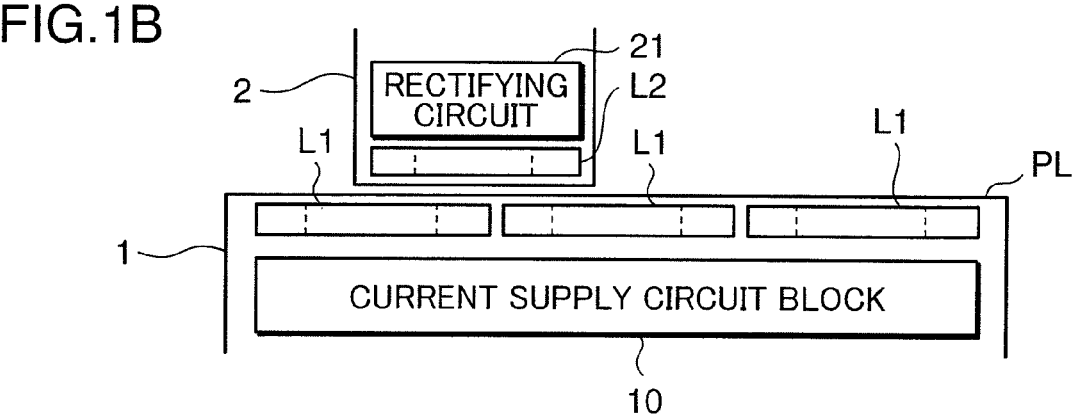

FIG. 1A is an arrangement diagram of power transmission coils L1 of a contactless power transmission system according to a first embodiment of the present invention. FIG. 1B is a side view of the contactless power transmission system according to the first embodiment of the present invention. The contactless power transmission system is provided with a power transmitting device 1 including the power transmission coils L1 for transmitting power and a power receiving device 2 including a power receiving coil L2 to be magnetically coupled to the power transmission coils L1 as shown in FIG. 1B.

The power transmitting device 1 includes a placing portion PL, on which the power receiving device 2 is to be placed, a plurality of power transmission coils L1 arranged below the placing portion PL, and a current supply circuit block 10 for supplying currents to the respective power transmission coils L1. The placing portion PL is, for example, formed by an area on a plane defined on a housing of the power transmitting device 1.

The power receiving device 2 includes a rectifying circuit 21, the power receiving coil L2, etc. An electric device such as an electric toothbrush, an electric tool or an electric shaver can be adopted as the power receiving device 2.

As shown in FIG. 1A, the power transmission coils L1 are arranged in a 3×3 matrix pattern. Specifically, the respective power transmission coils L1 are arranged in such a square matrix pattern that a vertical arrangement pitch and a horizontal arrangement pitch are equal. Thus, clearances between the power transmission coils L1 can be reduced. However, this is only an example and the vertical and horizontal arrangement pitches of the power transmission coils L1 may be set at different values.

Here, in FIG. 1A, three power transmission coils L1 in the first column from left are referred to as coils a, b, c; three power transmission coils L1 in the second column from left as coils d, e, f; and three power transmission coils L1 in the third columns from left as coils g, h, i. The power receiving coil L2 is called a coil A in FIG. 1A.

Although the power transmission coils L1 are arranged in the 3×3 matrix pattern in FIG. 1A, this is only an example and they may be arranged in an n (n is an integer equal to or greater than 1)×m (m is an integer equal to or greater than 1) matrix pattern. Alternatively, the power transmission coils L1 may be arbitrarily arranged in conformity with the shape of the outer edge of the placing portion PL.

Figure 2:
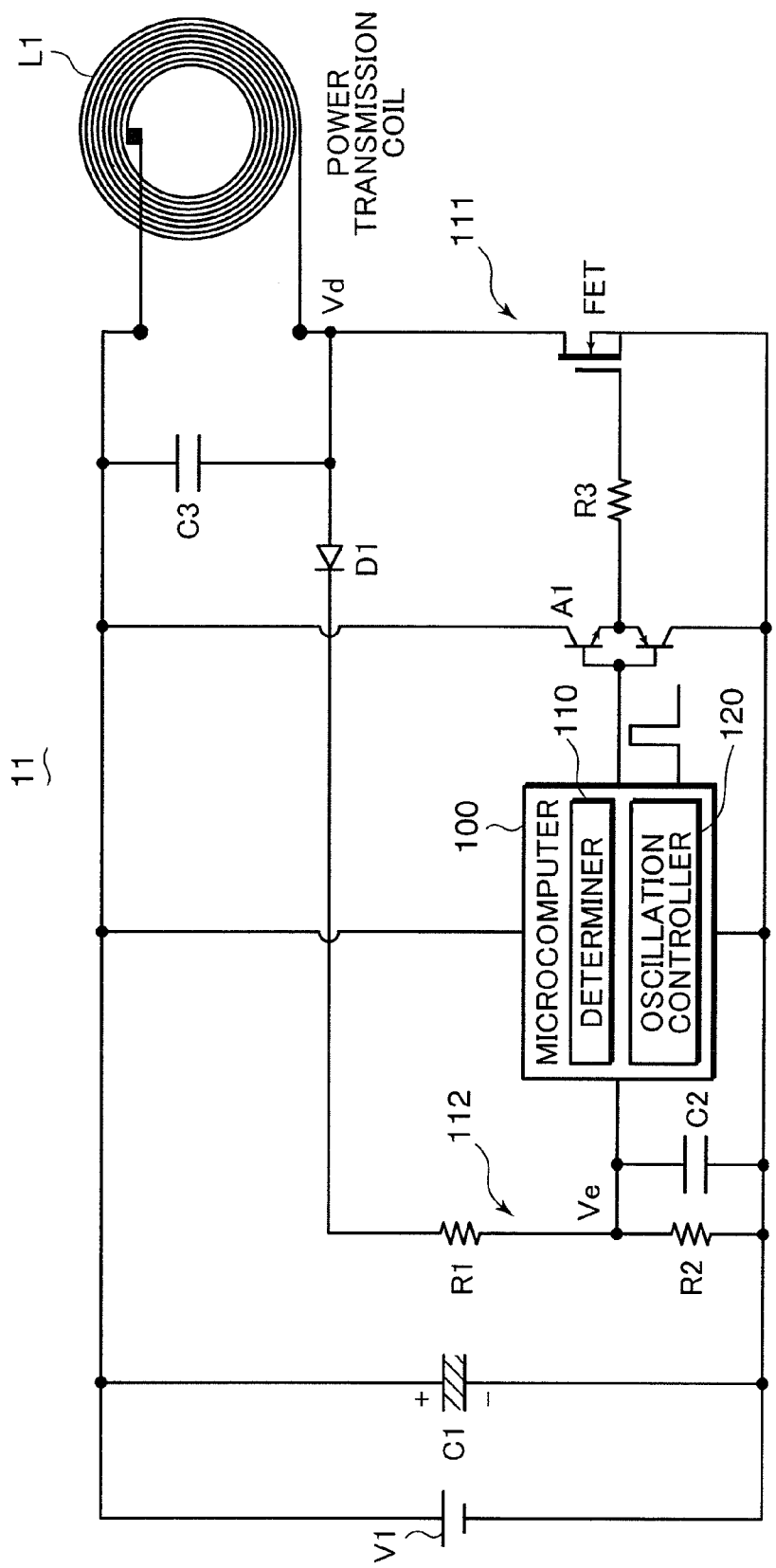
FIG. 2 is a circuit diagram of one current supply circuit and a microcomputer.

The current supply circuit block 10 shown in FIG. 1B is comprised of current supply circuits 11 (see FIG. 2) corresponding to the respective power transmission coils L1 and a microcomputer 100 (see FIG. 2). Since nine coils a to i are arranged in FIG. 1A, the current supply circuit block 10 includes nine current supply circuits 11 corresponding to the respective coils a to i and one microcomputer 100 connected to the nine current supply circuits 11.

FIG. 2 is a circuit diagram of one current supply circuit 11 and the microcomputer 100. The current supply circuit 11 shown in FIG. 2 includes an oscillator 111, a detector 112, the microcomputer 100, a power supply V1 and a capacitor C1. The oscillator 111 includes a resonant capacitor C3, a switching element FET, a resistor R3, an amplifying circuit A1 and an oscillation controller 120 and separately excites the corresponding power transmission coil L1. The detector 112 includes a diode D1, resistors R1, R2 and a capacitor C2 and detects the inductance of the corresponding power transmission coil L1. Here, the detector 112 detects the inductance of the power transmission coil L1 based on the voltage of the power transmission coil L1.

The power transmission coil L1 has one end thereof connected to a positive electrode of the power supply V1 and the other end thereof connected to a drain of the switching element FET.

The resonant capacitor C3 is connected in parallel to the power transmission coil L1 and resonates with the power transmission coil L1 when the switching element FET is turned off. The switching element FET is, for example, constructed by an n-channel field-effect transistor having a drain thereof connected to the power transmission coil L1, a source thereof grounded and a gate thereof connected to the microcomputer 100 via the resistor R3 and the amplifying circuit A1.

The switching element FET is turned on and off by a switching voltage output from the microcomputer 100. A p-channel field-effect transistor may be adopted as the switching element FET instead of the n-channel field-effect transistor.

The amplifying circuit A1 is constructed by an npn bipolar transistor and a pnp bipolar transistor whose emitters are cascade-connected, and amplifies the switching voltage output from the microcomputer 100. A collector of the npn bipolar transistor of the amplifying circuit A1 is connected to the positive electrode of the power supply V1. Further, a base of the pnp bipolar transistor of the amplifying circuit A1 is connected to a base of the npn bipolar transistor and the microcomputer 100 and a collector thereof is grounded.

The diode D1 has an anode thereof connected to the drain of the switching element FET and a cathode thereof connected to the resistor R1 and hinders the flow of a current from the microcomputer 100 toward the power transmission coil L1. The resistors R1, R2 divide a voltage Vd at the drain of the switching element FET and output it to the microcomputer 100. One end of the resistor R2 is connected to the resistor R1 and the other end thereof is grounded. The capacitor C2 is connected in parallel to the resistor R2.

The oscillator 111 thus constructed operates as follows. First of all, when the switching voltage output from the microcomputer 100 becomes a high level, this switching voltage is amplified by the amplifying circuit A1 and input to the switching element FET, which charges the gate capacity of the switching element FET to turn the switching element FET on. Then, a current flows from the resonant capacitor C3 toward the switching element FET and a current flows from the power transmission coil L1 toward the switching element FET.

Subsequently, when the switching voltage output from the microcomputer 100 becomes a low level, the switching element FET is turned off. In this way, the resonant capacitor C3 and the power transmission coil L1 start resonating and a magnetic flux generated from the power transmission coil L1 and this magnetic flux is interlinked with the coil A to generate a voltage in the coil A by electromagnetic induction. Thus, power is transmitted to the power receiving device 2.

The microcomputer 100 repeatedly turns the switching element FET on and off, thereby intermittently resonating the power transmission coil L1 and the resonant capacitor C3 and oscillating the power transmission coil L1 to transmit power to the power receiving device 2.

The microcomputer 100 includes a CPU, a ROM, a RAM, a dedicated hardware circuit and the like and functions as a determiner 110 and the oscillation controller 120 by executing a program stored in the ROM. Although the determiner 110 and the oscillation controller 120 are constructed by the microcomputer 100, they are not limited to this and may be constructed by dedicated hardware circuits.

The determiner 110 detects the placed position of the power receiving device 2 on the placing portion PL based on the inductances of the respective power transmission coils L1 detected by the detector 112. Specifically, the determiner 110 detects that a position of the placing portion PL right above the power transmission coil L1 corresponding to a voltage Ve is not the placed position of the power receiving device 2 if the voltage Ve as a divided voltage of the voltage Vd at the drain of the switching element FET by the resistors R1, R2 is equal to or larger than a specified value while detecting that the position of the placing portion PL right above the power transmission coil L1 corresponding to the voltage Ve is the placed position of the power receiving device 2 if the voltage Ve is smaller than the specified value.

Referring back to FIG. 2, the oscillation controller 120 specifies a plurality of power transmission coils L1 to be oscillated based on the placed position detected by the determiner 110, sets parameters of currents to flow into the plurality of power transmission coils such that the waveforms of the currents to flow into the respective specified power transmission coils are shifted from each other, and outputs switching voltages to the switching elements FET. Phases, frequencies or current magnitudes can be, for example, adopted as the parameters.

According to the power transmission system of this embodiment, regardless of at which position of the placing portion PL the power receiving device 2 is placed, there is no position on the placing portion PL right above the power transmission coils L1 to be oscillated where magnetic fluxes generated by the plurality of power transmission coils L1 cancel out and the magnetic fluxes interlinked with the power receiving coil L2 become 0. Thus, the power receiving device 2 can be reliably charged.

Further, since the plurality of power transmission coils to be oscillated are specified based on the placed position of the power receiving device 2, only the power transmission coils L1 contributing to contactless charging are oscillated and the power transmission coils L1 not contributing are not oscillated, with the result that power saving can be promoted.

Power saving can be promoted by a simple control of setting the parameters of the currents to flow into the plurality of power transmission coils L1 to be oscillated.

Which position of the placing portion PL is the placed position of the power receiving device 2 is determined based on the inductances of the power transmission coils L1. Thus, the placed position can be determined even without specially providing communication means for determining the placed position, wherefore the system can be simplified and the cost thereof can be reduced.

Second Embodiment

A contactless power transmission system according to a second embodiment of the present invention is characterized by mutually shifting the phases of currents to flow into a plurality of specified power transmission coils in the contactless power transmission system of the first embodiment. In this embodiment, the same elements as in the first embodiment are not described.

Figure 7:
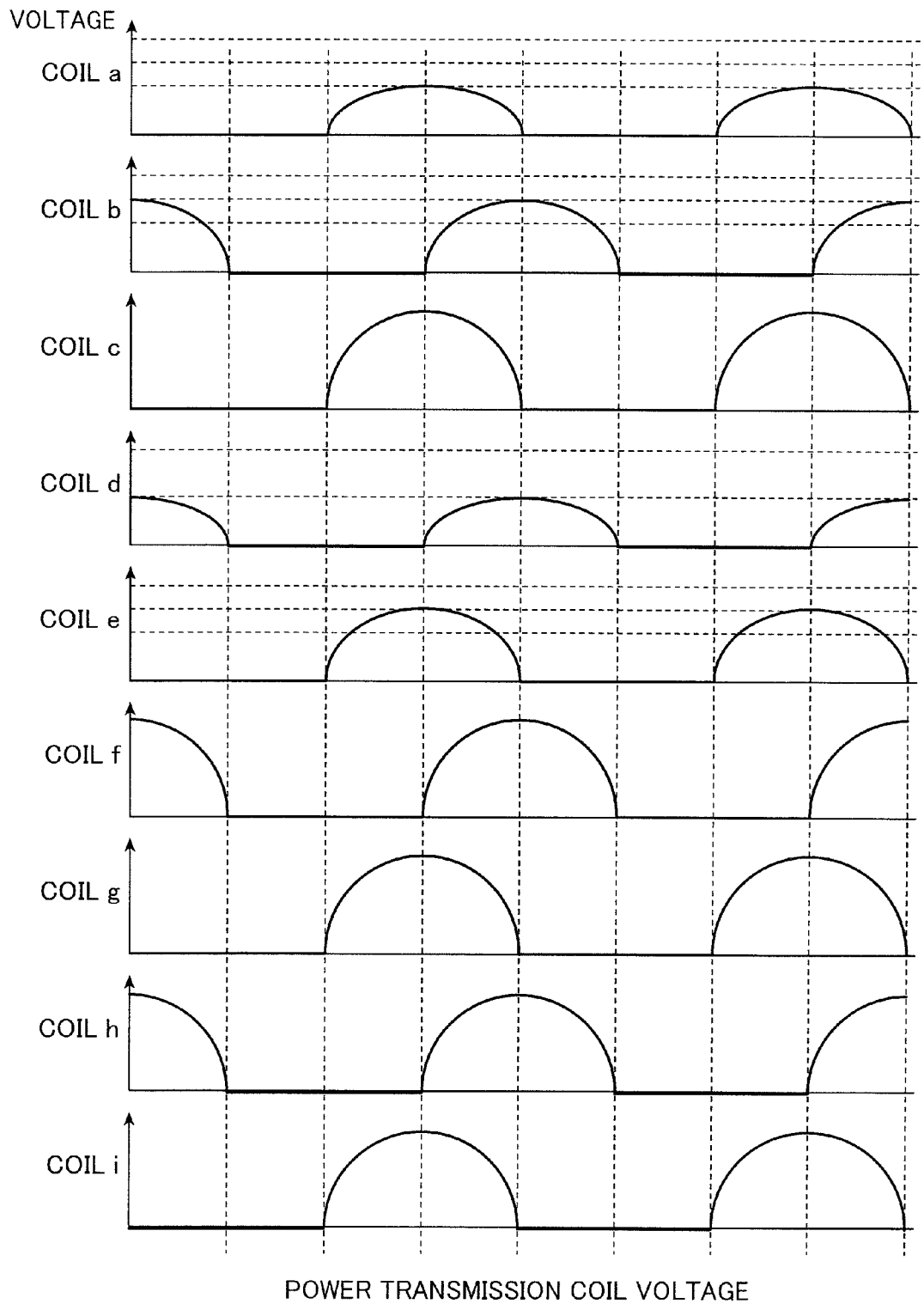

FIG. 7 are waveform charts of voltages Vd based on a ground level when the coil A was placed as shown in FIG. 1A and all the coils a to i were oscillated. In FIG. 7, the waveform charts in the first to ninth rows respectively show waveform charts of the coils a to i, wherein a vertical axis represents the voltage Vd and a horizontal axis represents time.

In FIG. 1A, the numbers of magnetic flux interlinkages between the coil A and the coils a, d are substantially the same. The numbers of magnetic flux interlinkages between the coil A and the coils b, e are substantially the same, but smaller than those of magnetic flux interlinkages between the coil A and the coils a, d. Accordingly, the inductances of the coils a, d are larger than those of the coils b, e as a result of the placement of the power receiving device 2.

Thus, as shown in FIG. 7, the amplitudes of the voltages Vd of the coils a, d become smaller than those of the voltages Vd of the coils b, e as a result of the placement of the power receiving device 2.

On the other hand, as shown in FIG. 1A, the magnetic fluxes of the coils c, f, g, h, i are not interlinked with the coil A. Thus, as shown in FIG. 7, the amplitudes of the voltages Vd of the coils c, f, g, h, i become larger than those of the voltages Vd of the coils a, b, d, e.

Thus, it can be determined that the power receiving device 2 is not placed right above the corresponding power transmission coil L1 if the voltage Vd is equal to or larger than a specified value and the power receiving device 2 is placed right above the corresponding power transmission coil L1 if the voltage Vd is smaller than the specified value.

Referring back to FIG. 2, the oscillation controller 120 specifies a plurality of power transmission coils L1 to be oscillated based on the placed position determined by the determiner 110 and outputs switching voltages to the switching elements FET so as to mutually shift the phases of the currents to flow into the plurality of specified power transmission coils L1.

Specifically, if there are a plurality of adjacent power transmission coils L1 below the placed position determined by the determiner 110, the oscillation controller 120 specifies these plurality of power transmission coils L1 as those to be oscillated. Further, if there is only one power transmission coil L1 below the placed position determined by the determiner 110, the oscillation controller 120 specifies this one power transmission coil L1 and at least one of the power transmission coils L1 adjacent to this one power transmission coil L1 as those to be oscillated.

Then, the oscillation controller 120 outputs the switching voltages so that currents whose phases are shifted from each other by 90° flow into the adjacent power transmission coils L1 in the plurality of power transmission coils L1 to be oscillated.

Figure 4:
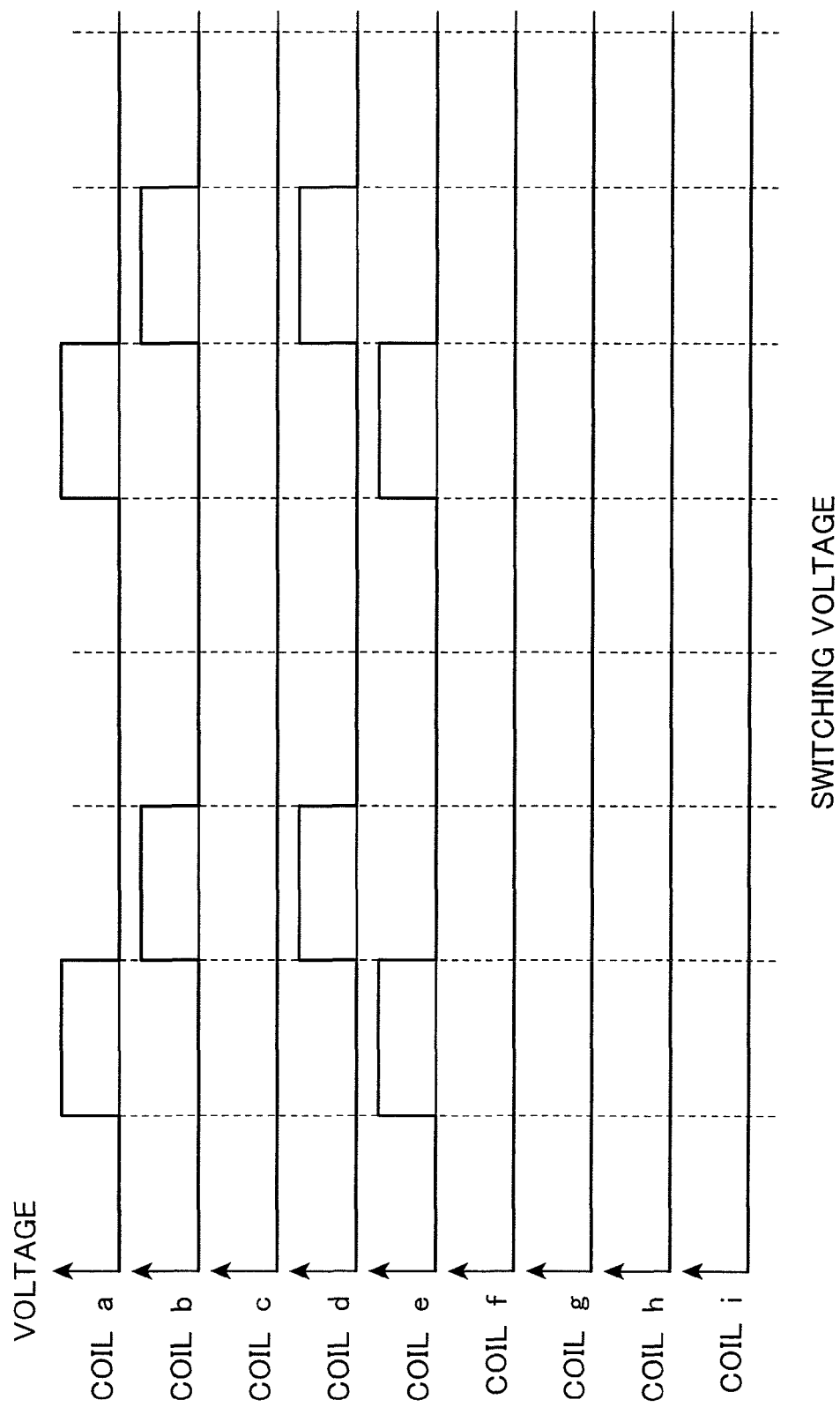
Figure 5:
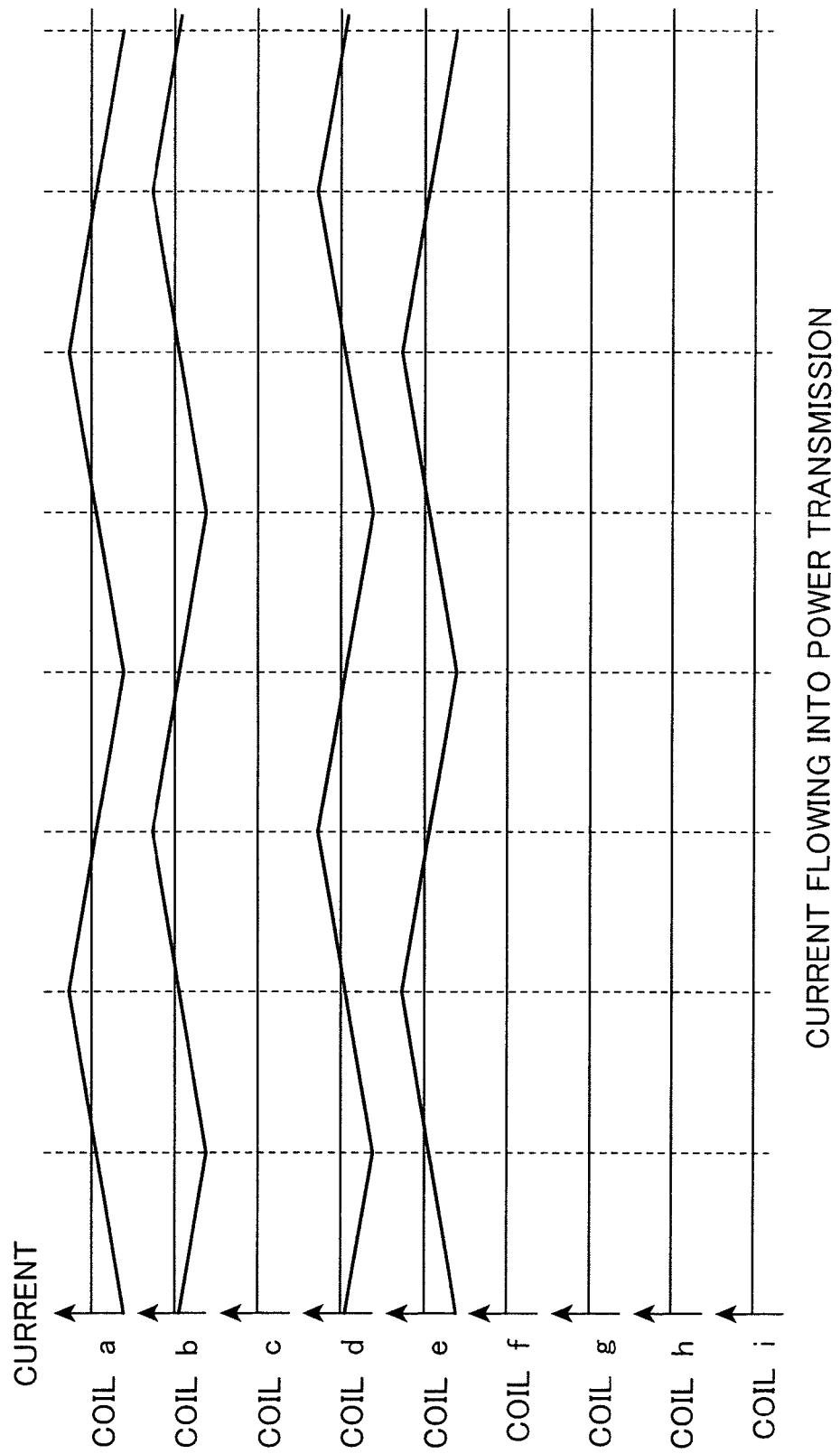
Figure 6:
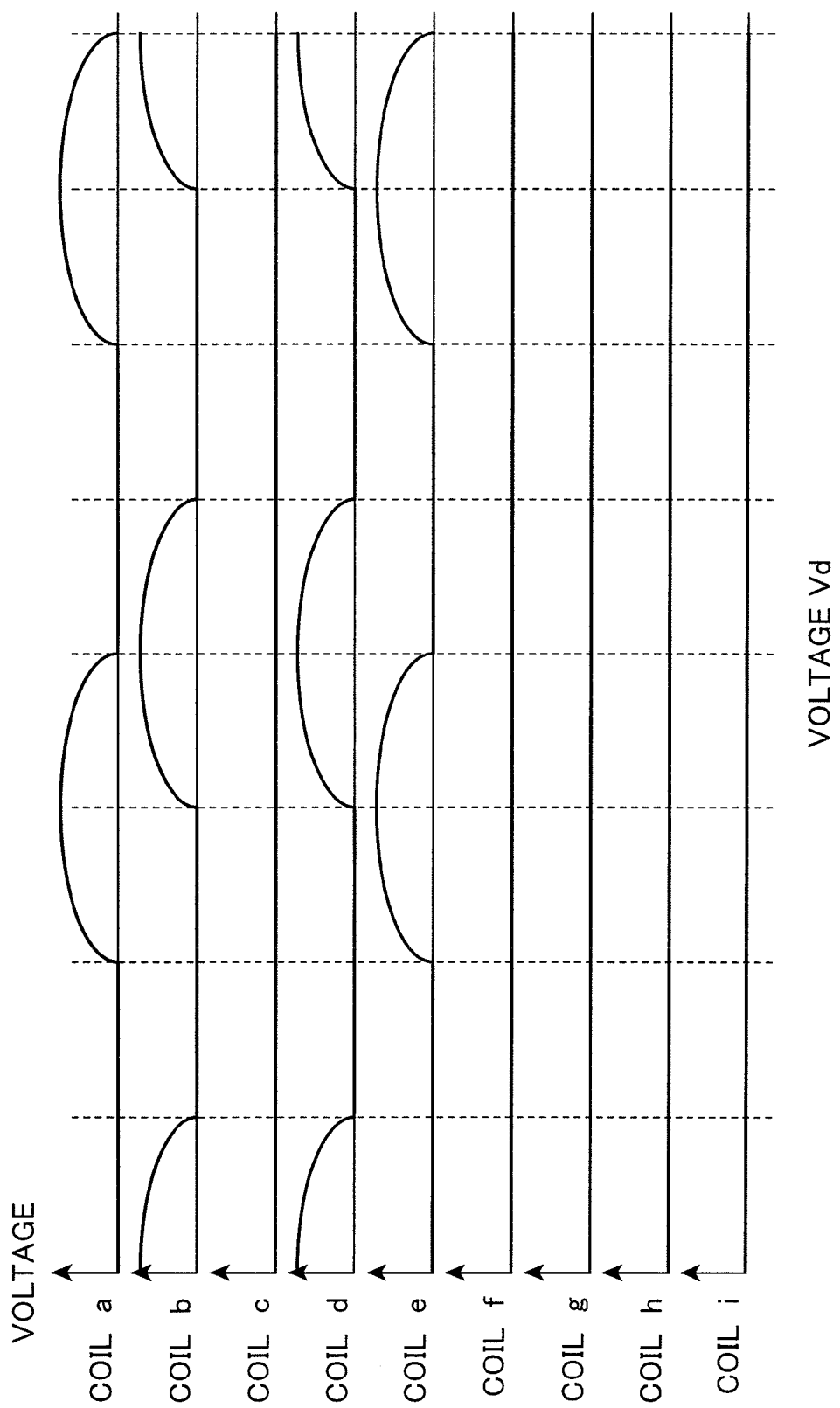

FIG. 4 are waveform charts showing switching voltages output by the oscillation controller 120 when the coil A was placed right above the coils a, b, d, e as shown in FIG. 1A. FIG. 5 are waveform charts showing currents respectively flowing into the coils a to i when the switching voltages shown in FIG. 4 were output. FIG. 6 are waveform charts of voltages Vd based on the ground level when the switching voltages shown in FIG. 4 were output. In FIG. 4, a vertical axis represents the switching voltage and a horizontal axis represents time. In FIG. 5, a vertical axis represents the current and a horizontal axis represents time. In FIG. 6, a vertical axis represents the voltage Vd and a horizontal axis represents time.

In the case of FIG. 1A, the oscillation controller 120 specifies the coils a, b, d, e as the power transmission coils L1 to be oscillated. Thus, the oscillation controller 120 retards the phases of the switching voltages for the coil b adjacent to and below the coil a and the coil d adjacent to and to the right of the coil a by 90° with respect to the switching voltage for the coil a as shown in FIG. 4. The oscillation controller 120 sets the same phase as that of the switching voltage for the coil a for the switching voltage for the coil e adjacent to and obliquely downward to the right of the coil a.

Specifically, if switching voltages of two phases shifted from each other by 90° are assumed to be first and second switching voltages, the oscillation controller 120 outputs the switching voltages so that, out of the power transmission coils to be oscillated, those to be oscillated by the first switching voltage and those to be oscillated by the second switching voltages are arranged in a checkered pattern.

Thus, it is understood that the phases of the currents to flow into the coils b, d are retarded from those of the currents to flow into the coils a, e by 90° as shown in FIG. 5. It is also understood that no currents flow into the coils c, f, g, h, i since these coils are not to be oscillated.

Further, it is understood that the phases of the voltages Vd for the coils b, d are retarded from those of the voltages Vd for the coils a, e by 90° as shown in FIG. 6. It is also understood that no voltages are generated in the coils c, f, g, h, i since these coils are not to be oscillated.

Figure 15:
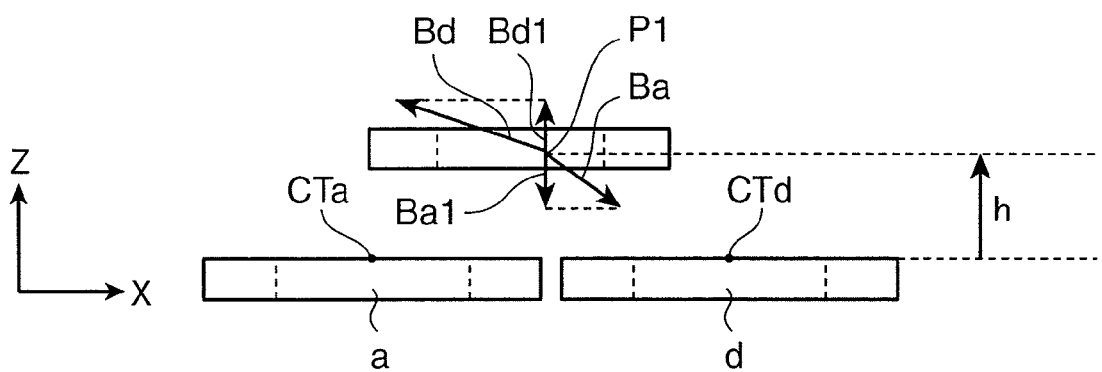
FIG. 15 is a diagram showing magnetic fluxes generated when the phases of the currents flowing into the coils a, d are the same.

FIG. 15 is a diagram showing magnetic fluxes generated when the phases of currents flowing into the coils a, d are the same. It should be noted that x shown in FIG. 15 indicates a horizontal direction in FIG. 1A and z indicates a height direction (direction orthogonal to the plane of FIG. 1A) in FIG. 1A. A position P1 shown in FIG. 15 is a position distanced by a height h in a z direction from a midpoint of a line segment connecting a center CTa of the coil a and a center CTd of the coil d. Here, the height h has a value substantially equivalent to a distance from the coils a, d to the placing portion PL. In other words, the position P1 indicates the position of the power receiving coil L2 when the power receiving device 2 is placed on the placing portion PL located at a midpoint between the coils a and d.

Figure 16:
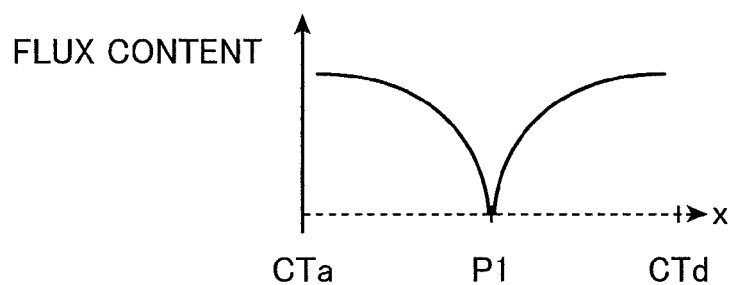
FIG. 16 is a graph showing the flux content of z-direction components at each position x when a position P1 was displaced in an x direction when currents of the same phase flowed into the coils a, d.
Figure 17:
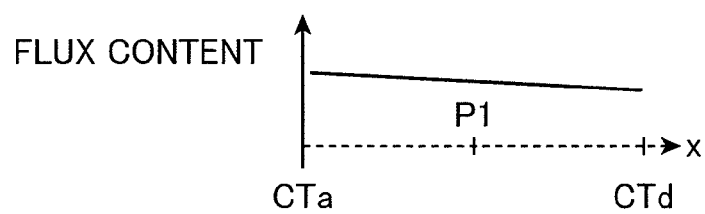
FIG. 17 is a graph showing the flux content of the z-direction components at each position x when the position P1 was displaced in the x direction when currents whose phases were shifted from each other by 90° flowed into the coils a, d.

FIG. 16 shows the flux content of z-direction components at each position x when the position P1 was displaced in an x direction when currents of the same phase flowed into the coils a, d. FIG. 17 shows the flux content of the z-direction components at each position x when the position P1 was displaced in the x direction when currents whose phases were shifted from each other by 90° flowed into the coils a, d.

As shown in FIGS. 15 and 16, at the position P1, a magnetic flux Ba of the coil a is oriented obliquely downward to the right and a magnetic flux Bd of the coil d is oriented obliquely upward to the left when the currents of the same phase flow into the coils a, d. Thus, Ba1 as a z-direction component of the magnetic flux Ba has substantially the same magnitude as Bd1 as a z-direction component of the magnetic flux Bd and is oriented in a direction right opposite to Bd1. Thus, Ba1 and Bd1 cancel out each other and the flux content of the z-direction components becomes substantially 0 at the position P1. When the power receiving coil L2 is located at the position P1, no magnetic flux interlinked with this power receiving coil L2 is present and the power transmitting device 1 cannot transmit power to the power receiving device 2.

Specifically, it is understood that the flux content of z-direction components peaks at a position where z=h, x=CTa or z=h, x=CTd, decreases along a bell-shaped curve as x approaches P1 from CTa and increases along a bell-shaped curve as x approaches CTd from P1 as shown in FIG. 16.

From this, it is understood that the power transmitting device 1 can transmit a large amount of power to the power receiving device 2 when the power receiving device 2 is placed near and right above the center CTa or the center CTd, but the power transmitted to the power receiving device 2 by the power transmitting device 1 decreases as the placed position of the power receiving device 2 approaches the position P1. Thus, if the power receiving device 2 is placed near and right above the position P1, the power receiving device 2 cannot receive power from the power transmitting device 1.

On the other hand, as shown in FIG. 17, the flux content of the z-direction components is substantially constant at the respective x-direction positions x where z=h when the phases of the currents to flow into the coils a, d are shifted from each other by 90°. Thus, regardless of at which position of a group of power transmission coils L1 to be oscillated the power receiving device 2 is placed, magnetic fluxes can be interlinked with the power receiving coil L2 and power can be transmitted to the power receiving device 2.

Referring back to FIG. 2, the power supply V1 is constructed by a power supply circuit for converting a commercial voltage of, e.g. 100 V into a direct-current voltage of a specified level, wherein a positive electrode thereof is connected to the power transmission coil L1 and a negative electrode thereof is grounded. The capacitor C1 is constructed, for example, by an electrolytic capacitor connected in parallel to the power supply V1 and smoothes a voltage output from the power supply V1.

Figure 3:
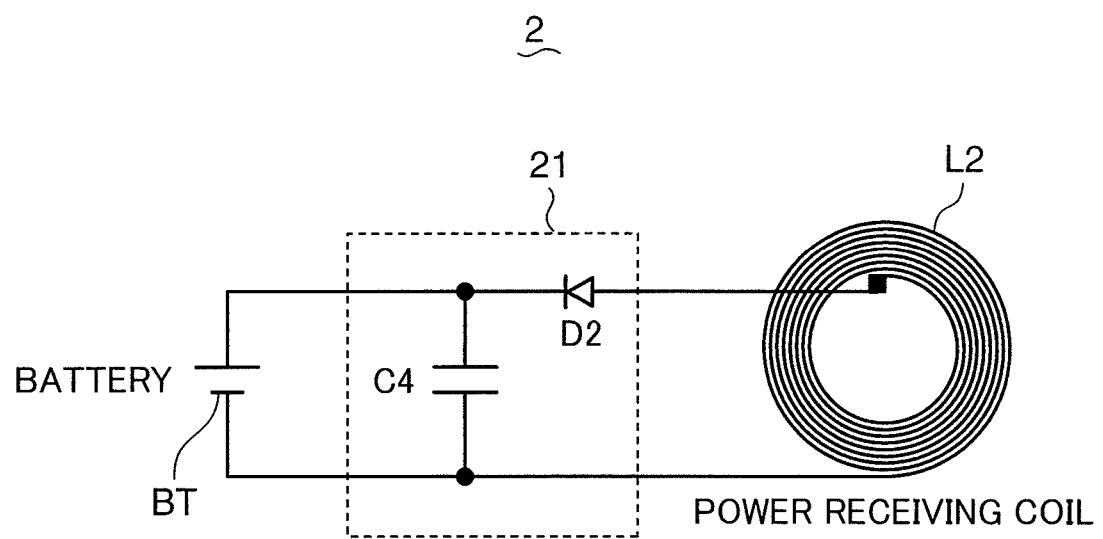
FIG. 3 is a circuit diagram of a power receiving device shown in FIGS. 1A and 1B, FIG. 4 are waveform charts showing switching voltages output by an oscillation controller when a coil A shown in FIG. 1A was placed, FIG. 5 are waveform charts showing currents respectively flowing into all the coils when the switching voltages shown in FIG. 4 were output, FIG. 6 are waveform charts of voltages at drains of switching elements based on a ground level when the switching voltages shown in FIG. 4 were output, FIG. 7 are waveform charts of voltages at the drains of switching elements FET based on the ground level when the coil A was placed as shown in FIG. 1A and all the coils were oscillated, FIG. 8 are waveform charts showing switching voltages output by the oscillation controller when the coil A was placed right above the coils a, b, d, e as shown in FIG. 1A, FIG. 9 are waveform charts showing currents respectively flowing into all the coils when the switching voltages shown in FIG. 8 were output, FIG. 10 are waveform charts of voltages Vd based on the ground level when the switching voltages shown in FIG. 8 were output, FIG. 11 are waveform charts of the voltages Vd based on the ground level when the coil A was placed as shown in FIG. 1A and all the coils were oscillated, FIG. 12 are waveform charts showing switching voltages output by the oscillation controller when the coil A was placed right above the coils a, b, d, e as shown in FIG. 1A, FIG. 13 are waveform charts showing currents respectively flowing into all the coils when the switching voltages shown in FIG. 12 were output, FIG. 14 are waveform charts of voltages Vd based on the ground level when the switching voltages shown in FIG. 12 were output.

FIG. 3 is a circuit diagram of the power receiving device 2 shown in FIG. 1. The power receiving device 2 includes the rectifying circuit 21, the power receiving coil L2 and a secondary battery BT. The power transmission coil L2 is magnetically coupled to the power transmission coils L1 and receives power transmitted from the power transmission coils L1.

The rectifying circuit 21 includes a diode D2 and a capacitor C4. The capacitor C4 smoothes a voltage generated in the power receiving coil L2. The diode D2 rectifies the voltage generated in the power receiving coil L2. Thus, a direct-current voltage is applied to the secondary battery BT, which is charged by this direct-current voltage. For example, one of various secondary batteries such as a lithium ion secondary battery, a nickel hydrogen secondary battery and a lead storage battery can be adopted as the secondary battery BT.

As described above, according to the power transmission system of this embodiment, regardless of at which position of the placing portion PL the power receiving device 2 is placed, there is no position on the placing portion PL right above the power transmission coils L1 to be oscillated where magnetic fluxes generated by the plurality of power transmission coils L1 cancel out and the magnetic fluxes interlinked with the power receiving coil L2 become 0. Thus, the power receiving device 2 can be reliably charged.

Further, since the plurality of power transmission coils to be oscillated are specified based on the placed position of the power receiving device 2, only the power transmission coils L2 contributing to contactless charging are oscillated and the power transmission coils L1 not contributing are not oscillated, with the result that power saving can be promoted.

The power receiving device 2 can be reliably charged and power saving can be promoted by a simple control of mutually shifting the phases of the currents to flow into the plurality of power transmission coils L1 to be oscillated.

Which position of the placing portion PL is the placed position of the power receiving device 2 is determined based on the inductances of the power transmission coils L1. Thus, the placed position can be determined even without specially providing communication means for determining the placed position, wherefore the system can be simplified and the cost thereof can be reduced.

Third Embodiment

A contactless power transmission system according to a third embodiment is characterized by changing the frequencies of currents to flow into a plurality of specified power transmission coils in the contactless power transmission system of the first embodiment. In this embodiment, the same elements as in the first and second embodiment are not described.

Figure 11:
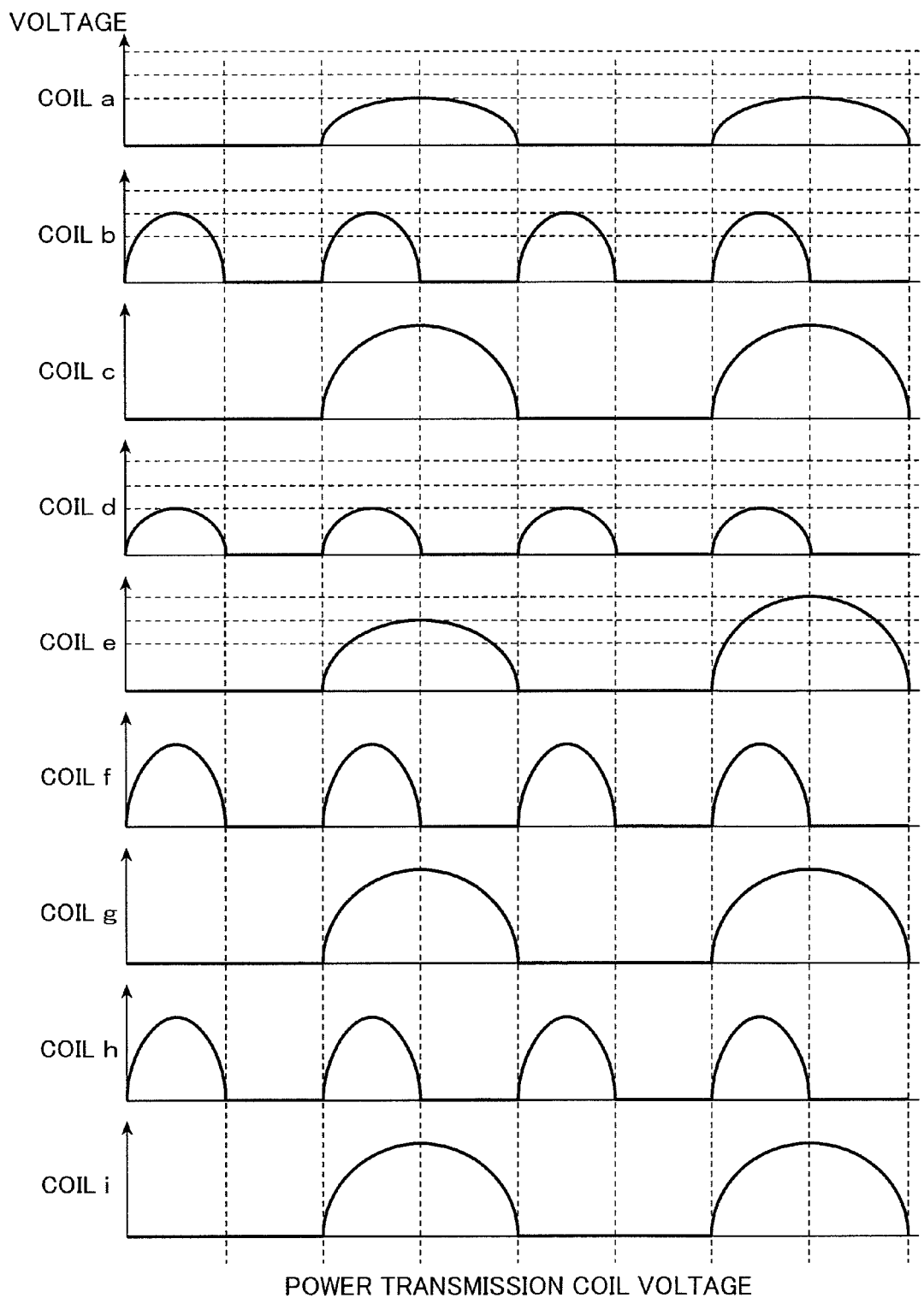

FIG. 11 are waveform charts of voltages Vd based on a ground level when the coil A was placed as shown in FIG. 1A and all the coils a to i were oscillated.

In FIG. 11, the waveform charts in the first to ninth rows respectively show waveform charts of the coils a to i, wherein a vertical axis represents the voltage Vd and a horizontal axis represents time.

In FIG. 1A, the numbers of magnetic flux interlinkages between the coil A and the coils a, d are substantially the same. The numbers of magnetic flux interlinkages between the coil A and the coils b, e are substantially the same, but smaller than those of magnetic flux interlinkages between the coil A and the coils a, d. Accordingly, the inductances of the coils a, d are larger than those of the coils b, e as a result of the placement of the power receiving device 2.

Thus, as shown in FIG. 11, the amplitudes of the voltages Vd of the coils a, d become smaller than those of the voltages Vd of the coils b, e as a result of the placement of the power receiving device 2.

On the other hand, as shown in FIG. 1A, the magnetic fluxes of the coils c, f, g, h, i are not interlinked with the coil A. Thus, as shown in FIG. 11, the amplitudes of the voltages Vd of the coils c, f, g, h, i become larger than those of the voltages Vd of the coils a, b, d, e.

Thus, it can be determined that the power receiving device 2 is not placed right above the corresponding power transmission coil L1 if the voltage Vd is equal to or larger than a specified value and the power receiving device 2 is placed right above the corresponding power transmission coil L1 if the voltage Vd is smaller than the specified value.

Referring back to FIG. 2, the oscillation controller 120 specifies a plurality of power transmission coils L1 to be oscillated based on the placed position determined by the determiner 110 and outputs switching voltages to the switching elements FET so as to mutually shift the frequencies of the currents to flow into the plurality of specified power transmission coils L1.

Specifically, if there are a plurality of adjacent power transmission coils L1 below the placed position determined by the determiner 110, the oscillation controller 120 specifies these plurality of power transmission coils L1 as those to be oscillated. Further, if there is only one power transmission coil L1 below the placed position determined by the determiner 110, the oscillation controller 120 specifies this one power transmission coil L1 and at least one of the power transmission coils L1 adjacent to this one power transmission coil L1 as those to be oscillated.

Then, the oscillation controller 120 outputs the switching voltages so that currents having a frequency ratio of 1:m flow into the adjacent power transmission coils L1 in the plurality of power transmission coils L1 to be oscillated. Here, m can be, for example, 2.

Figure 8:
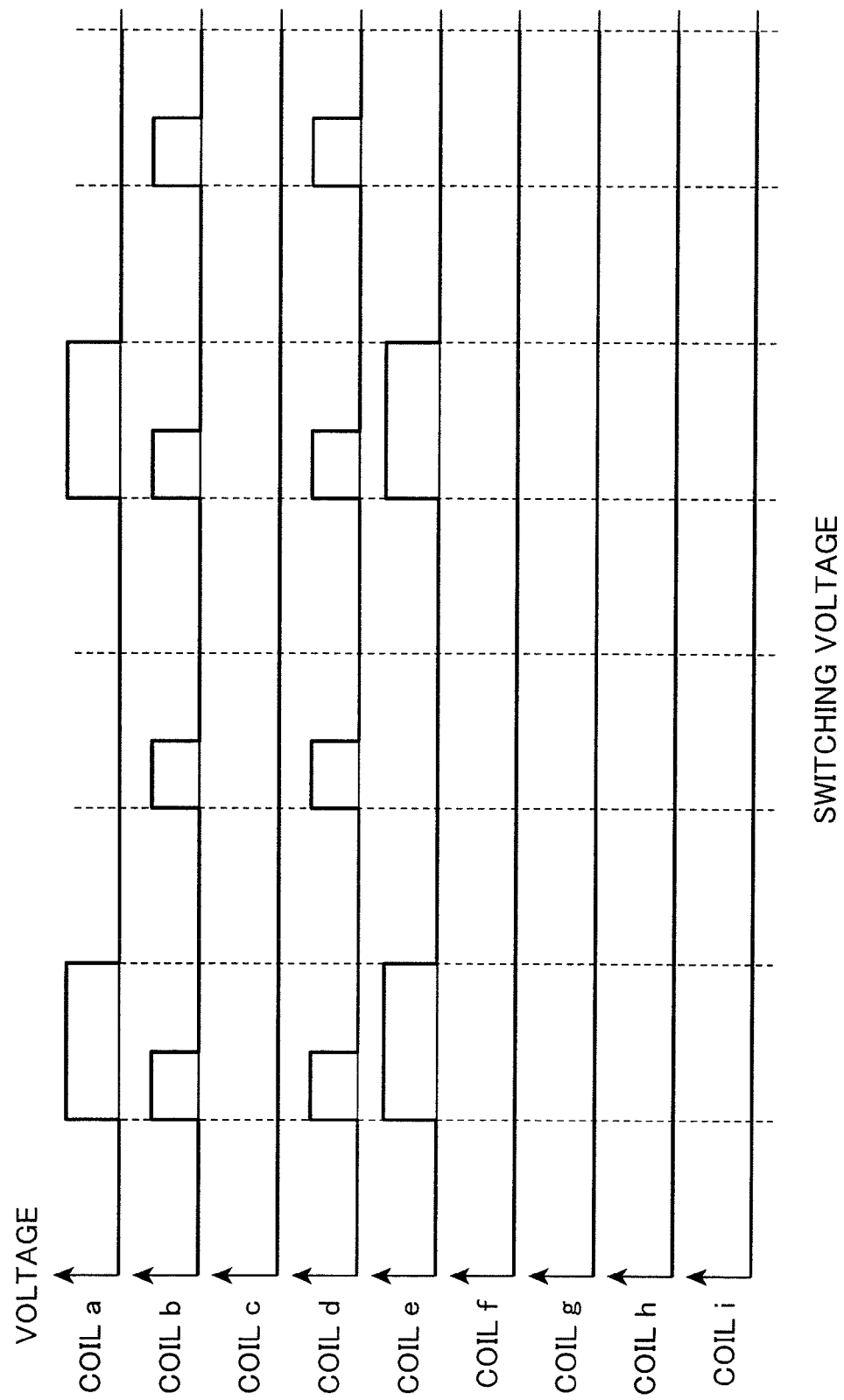
Figure 9:
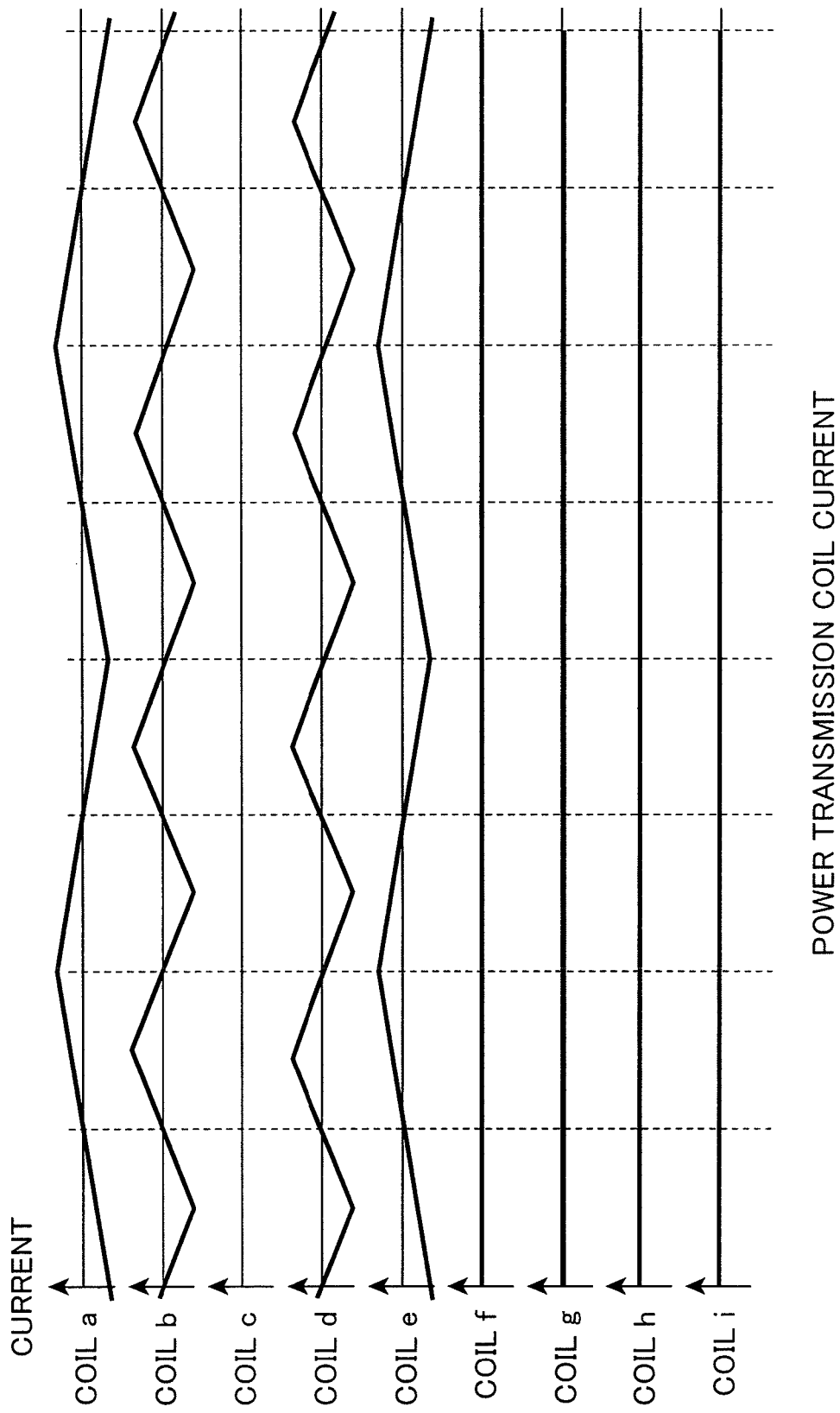
Figure 10:
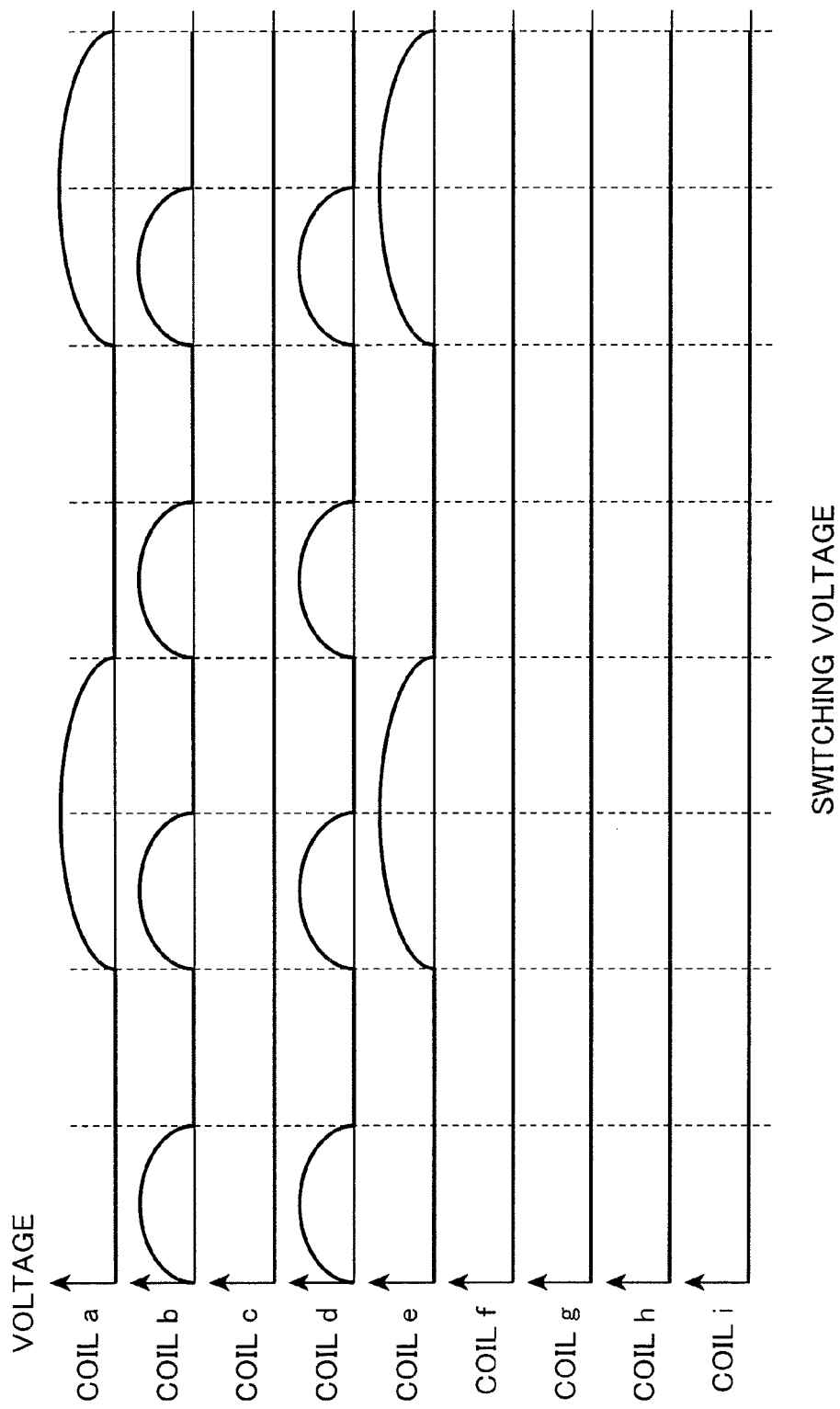

FIG. 8 are waveform charts showing switching voltages output by the oscillation controller 120 when the coil A was placed right above the coils a, b, d, e as shown in FIG. 1A. FIG. 9 are waveform charts showing currents respectively flowing into the coils a to i when the switching voltages shown in FIG. 8 were output. FIG. 10 are waveform charts of voltages Vd based on the ground level when the switching voltages shown in FIG. 8 were output. In FIG. 8, a vertical axis represents the switching voltage and a horizontal axis represents time. In FIG. 9, a vertical axis represents the current and a horizontal axis represents time. In FIG. 10, a vertical axis represents the voltage Vd and a horizontal axis represents time.

In the case of FIG. 1A, the oscillation controller 120 specifies the coils a, b, d, e as the power transmission coils L1 to be oscillated. Thus, the oscillation controller 120 doubles the frequencies of the switching voltages for the coil b adjacent to and below the coil a and the coil d adjacent to and to the right of the coil a with respect to the switching voltage for the coil a as shown in FIG. 8. The oscillation controller 120 sets the same frequency as that of the switching voltage for the coil a for the switching voltage for the coil e adjacent to and obliquely downward to the right of the coil a.

Specifically, if a switching voltage having a frequency f1 (Hz) and a switching voltage having a frequency 2·f1 (Hz) are assumed to be first and second switching voltages, the oscillation controller 120 outputs the switching voltages so that, out of the power transmission coils L1 to be oscillated, those to be oscillated by the first switching voltage and those to be oscillated by the second switching voltages are arranged in a checkered pattern.

Thus, it is understood that the frequencies of the currents flowing into the coils b, d are double those of the currents flowing into the coils a, e as shown in FIG. 9. It is also understood that no currents flow into the coils c, f, g, h, i since these coils are not to be oscillated.

Further, it is understood that the frequencies of the voltages Vd for the coils b, d are double those of the voltages Vd for the coils a, e as shown in FIG. 10. It is also understood that no voltages are generated in the coils c, f, g, h, i since these coils are not to be oscillated.

According to the power transmission system of this embodiment, the power receiving device 2 can be reliably charged and power saving can be promoted by a simple control of changing the frequencies of the currents to flow into the plurality of power transmission coils L1 to be oscillated in addition to the effects of the first embodiment.

Fourth Embodiment

A contactless power transmission system according to a fourth embodiment of the present invention is characterized by changing the magnitudes of currents to flow into a plurality of specified power transmission coils in the contactless power transmission system of the first embodiment. In this embodiment, the same elements as in the first to third embodiments are not described.

In this embodiment, the determiner 110 shown in FIG. 2 causes equal currents to flow into the coils a to i and specifies the placed position of the coil A before changing duty ratios of switching voltages to change the magnitudes of currents to flow into a plurality of specified power transmission coils.

Further, the oscillation controller 120 specifies a plurality of power transmission coils L1 to be oscillated based on the placed position determined by the determiner 110 and outputs switching voltages having different duty ratios to the switching elements FET corresponding to the specified power transmission coils L1 so that currents having a magnitude ratio of 1:m flow into the plurality of specified power transmission coils L1. In this embodiment, m is, for example, set at 2.

Figure 12:
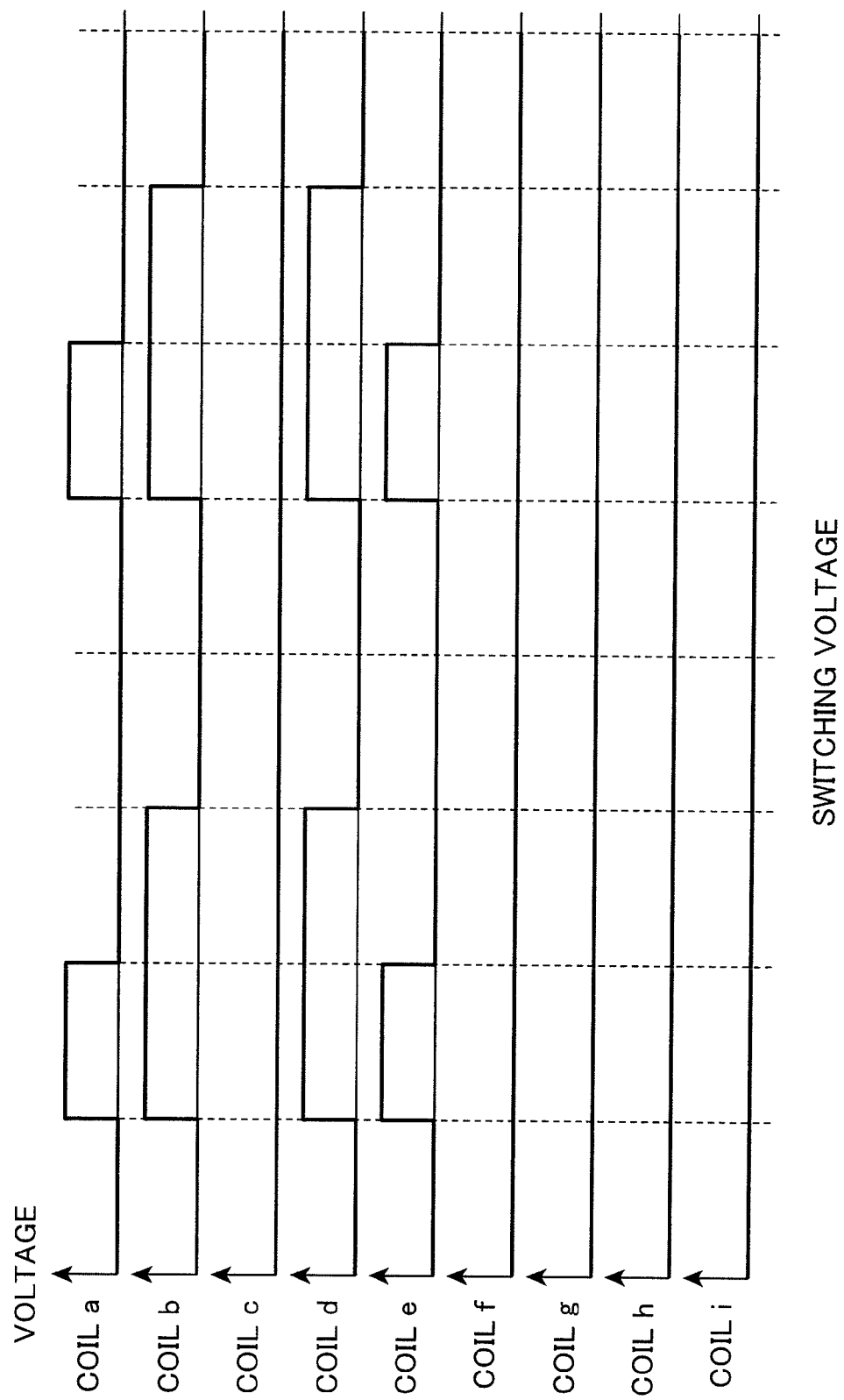
Figure 13:
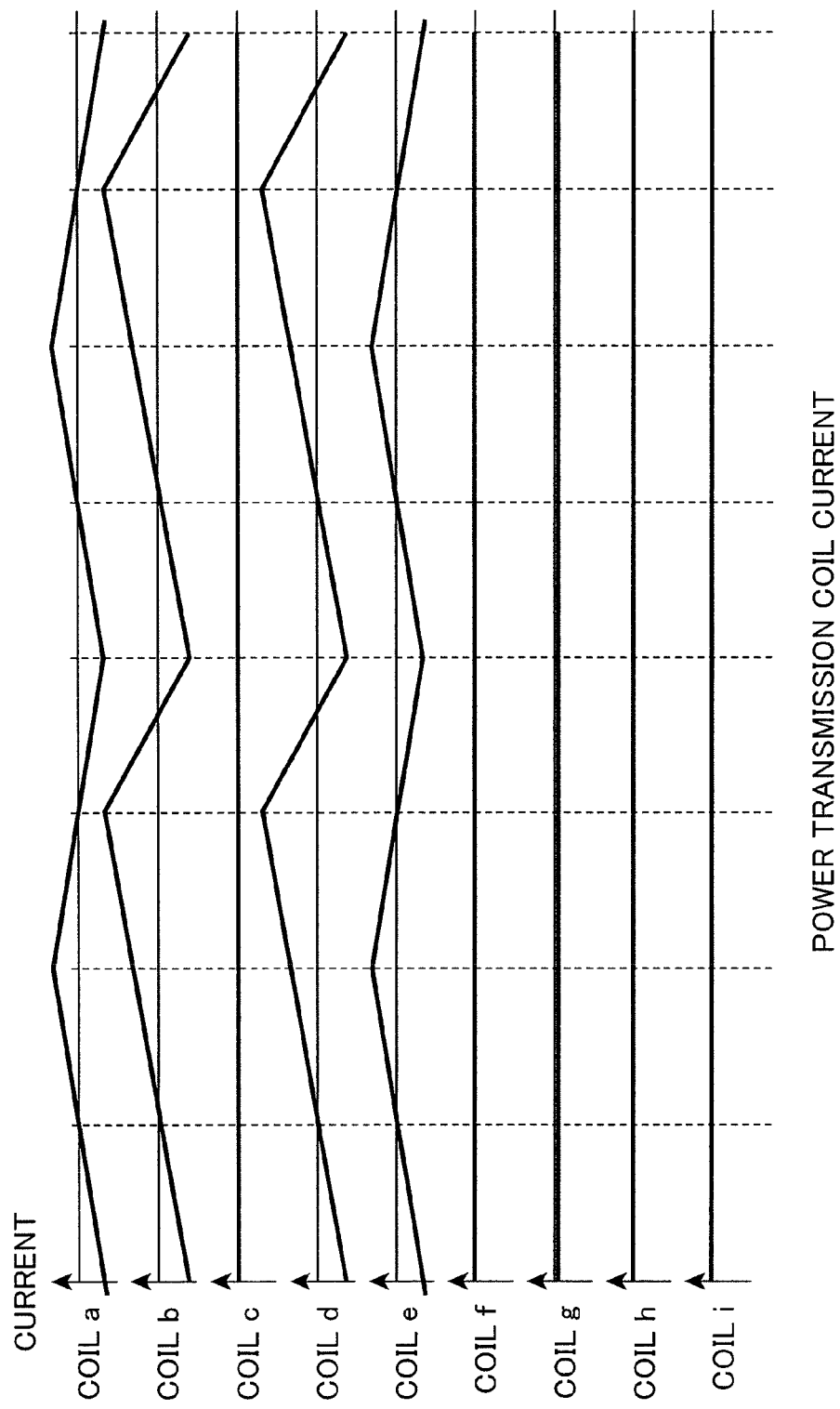

FIG. 12 are waveform charts of switching voltages output by the oscillation controller 120 when the coil A was placed right above the coils a, b, d, e as shown in FIG. 1A. FIG. 13 are waveform charts showing currents respectively flowing into the coils a to i when the switching voltages shown in FIG. 12 were output.

Figure 14:
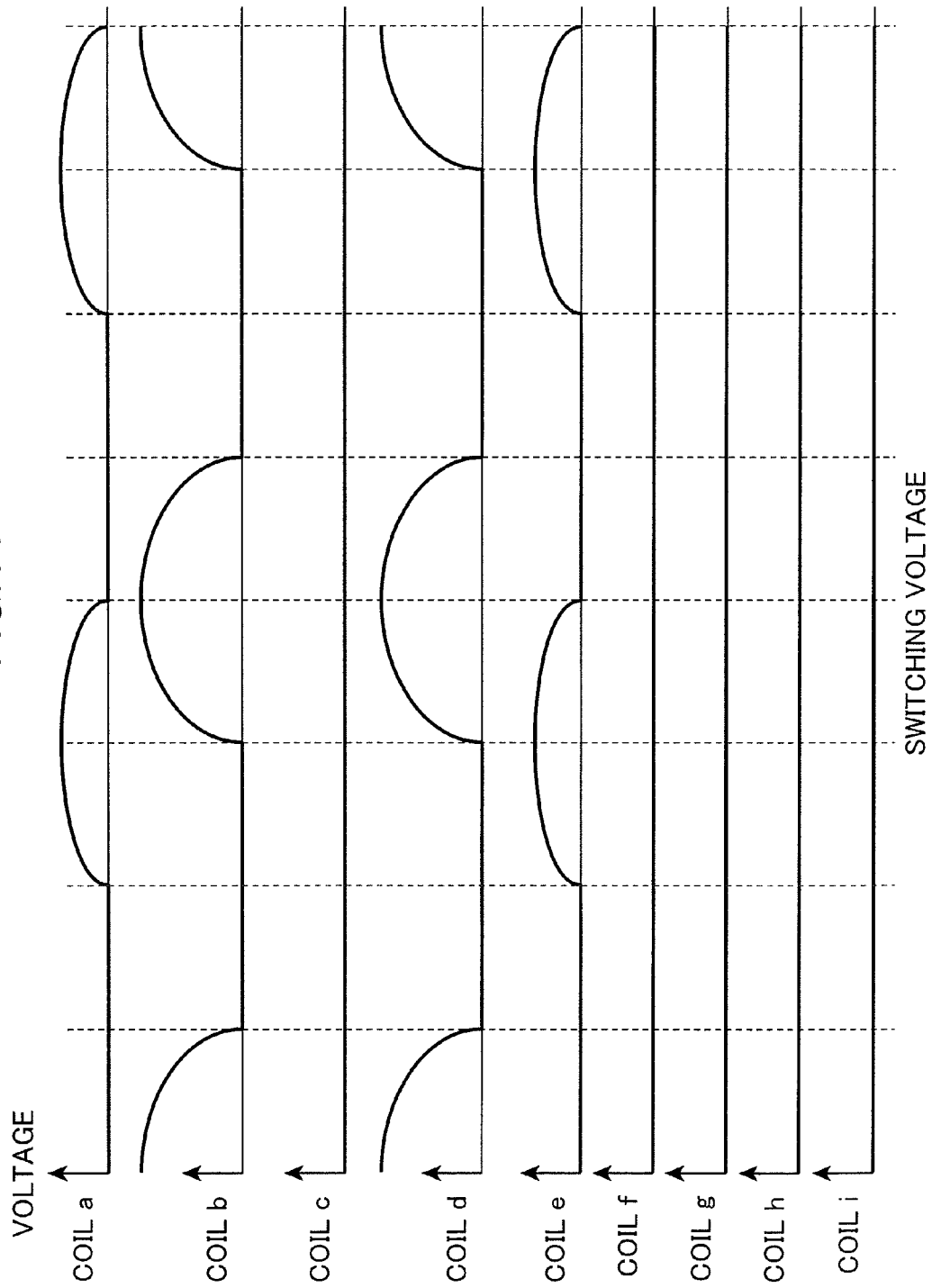

FIG. 14 are waveform charts of voltages Vd based on a ground level when the switching voltages shown in FIG. 12 were output. In FIG. 12, a vertical axis represents the switching voltage and a horizontal axis represents time. In FIG. 13, a vertical axis represents the current and a horizontal axis represents time. In FIG. 14, a vertical axis represents the voltage Vd and a horizontal axis represents time.

In the case of FIG. 1A, the oscillation controller 120 specifies the coils a, b, d, e as the power transmission coils L1 to be oscillated. Thus, the oscillation controller 120 doubles the duty ratios of the switching voltages for the coil b adjacent to and below the coil a and the coil d adjacent to and to the right of the coil a with respect to the duty ratio of the switching voltage for the coil a as shown in FIG. 12.

The oscillation controller 120 sets the same duty ratio as that of the switching voltage for the coil a for the switching voltage for the coil e adjacent to and obliquely downward to the right of the coil a.

Specifically, if a switching voltage having a duty ratio d1 (%) and a switching voltage having a duty ratio 2·d1 (%) are assumed to be first and second switching voltages, the oscillation controller 120 outputs the switching voltages so that, out of the power transmission coils L1 to be oscillated, those to be oscillated by the first switching voltage and those to be oscillated by the second switching voltages are arranged in a checkered pattern.

Thus, it is understood that the magnitudes of the currents flowing into the coils b, d are double those of the currents flowing into the coils a, e as shown in FIG. 13. It is also understood that no currents flow into the coils c, f, g, h, i since these coils are not to be oscillated.

Further, it is understood that the magnitudes of the voltages Vd for the coils b, d are double those of the voltages Vd for the coils a, e as shown in FIG. 14. It is also understood that no voltages are generated in the coils c, f, g, h, i since these coils are not to be oscillated.

According to the power transmission system of this embodiment, the power receiving device 2 can be reliably charged and power saving can be promoted by a simple control of changing the magnitudes of the currents to flow into the plurality of power transmission coils L1 to be oscillated in addition to the effects of the first embodiment.

Although the magnitudes of the currents to flow into the power transmission coils L1 are changed by changing the duty ratios of the switching voltages in the above description, the present invention is not limited thereto. For example, if a first current and a second current whose magnitude is double that of the first current are assumed to flow into the power transmission coils L1, circuit constants of the respective current supply circuits 11 may be so set that the power transmission coils L1 to be oscillated by the first current and those to be oscillated by the second current are arranged in a checkered pattern.

Fifth Embodiment

A contactless power transmission system according to a fifth embodiment of the present invention is characterized by intermittently oscillating the power transmission coils L1 other than those to be oscillated in the contactless power transmission system of the first embodiment. In this embodiment, the same elements as in the first to fourth embodiments are not described.

In this embodiment, the oscillation controller 120 shown in FIG. 2 specifies the power transmission coils L1 to be oscillated in the same manner as in the first embodiment. Then, the oscillation controller 120 outputs switching voltages to the switching elements FET corresponding to the power transmission coils L1 other than those to be oscillated so that the power transmission coils L1 other than those to be oscillated are intermittently oscillated.

Here, in this embodiment, the power transmission coils L1 other than those to be oscillated are intermittently oscillated only for 1 ms per second. Accordingly, the oscillation controller 120 may, for example, output the same voltages as the switching voltages for the power transmission coils L1 to be oscillated to the switching elements FET corresponding to the power transmission coils L1 other than those to be oscillated only for 1 ms per second.

If the oscillation of the power transmission coils L1 other than those to be oscillated is completely stopped, voltages VD corresponding to the power transmission coils L1 other than those to be oscillated do not change even if another power receiving device 2 is placed on the placing portion PL. Thus, the detector 112 cannot detect the placement of this power receiving device 2.

Accordingly, in this embodiment, it is made possible to detect the placement of another power receiving device 2 by intermittently oscillating the power transmission coils L1.

Sixth Embodiment

A contactless power transmission system according to a sixth embodiment of the present invention is characterized by determining the placed position by setting weighting values for the respective power transmission coils L1 according to the voltages of the respective power transmission coils L1. In this embodiment, the same elements as in the first to fifth embodiments are not described.

In this embodiment, the determiner 110 shown in FIG. 2 sets a larger weighting value for a certain power transmission coil L1 having a smaller corresponding voltage Vd, and determines that the power receiving device 2 is placed right above this power transmission coil L1 if the weighting value is equal to or larger than a specified value while determining that the power receiving device 2 is not placed right above this power transmission coil L1 if the weighting value is smaller than the specified value.

Figure 18:
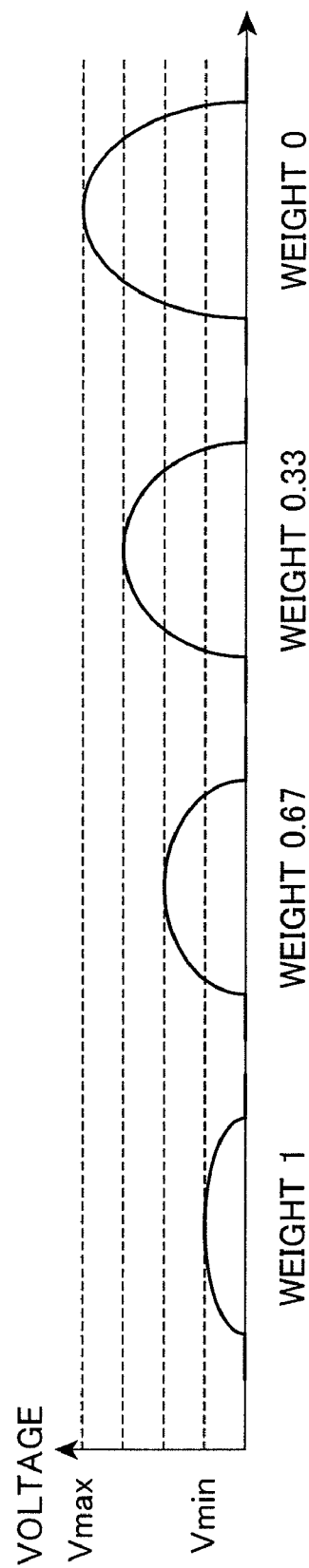
FIG. 18 is a waveform chart of the voltages Vd showing a relationship between the voltages Vd and weighting values.

FIG. 18 is a waveform chart of the voltages Vd showing a relationship between the voltages Vd and the weighting values. As shown in FIG. 18, the determiner 110 sets a predetermined weighting value as the weighting value for a certain power transmission coil L1 according to the amplitude of the voltage Vd corresponding to this power transmission coil L1.

Here, the determiner 110 may, for example, set a weighting value corresponding to a presumed maximum value Vmax of the amplitude of the voltage Vd to 0, set a weighting value corresponding to a presumed minimum value Vmin of the amplitude of the voltage Vd to 1 and calculate the weighting value for this voltage Vd through the linear interpolation of the amplitude of the voltage Vd detected by the detector 112.

Since the amplitude of the first voltage Vd from left corresponds to the minimum value Vmin in FIG. 18, 1 as the maximum weighting value is set for the power transmission coil L1 corresponding to this voltage Vd. Since the amplitude of the second voltage Vd from left is lower than Vmax by (Vmax−Vmin)×(⅔), a weighting value of 1×⅔=0.67 is set for the power transmission coil L1 corresponding to this voltage Vd by the linear interpolation. Since the amplitude of the third voltage Vd from left is lower than Vmax by (Vmax−Vmin)×(⅓), a weighting value of 1×⅓=0.33 is set for the power transmission coil L1 corresponding to this voltage Vd. Since the amplitude of the fourth voltage Vd from left corresponds to the maximum value Vmax, 0 as the minimum weighting value is set for the power transmission coil L1 corresponding to this voltage Vd.

Then, the determiner 110 determines that the position of the placing portion PL right above this power transmission coil L1 is not the placed position for the power transmission coil L1 whose weighting value is, for example, equal to or below 0.1 while determining that the position of the placing portion PL right above this power transmission coil L1 is the placed position for the power transmission coil L1 whose weighting value is larger than 0.1.

As described above, according to the contactless power transmission system of this embodiment, the voltage for the power transmission coil L1 decreases as a distance to the power receiving coil L2 gets shorter. Thus, by setting the weighting value for each power transmission coil L1 based on the voltage of each power transmission coil L1, whether or not the power receiving device 2 is placed right above each power transmission coil L1 can be determined based on the set weighting value and the size of the placed power receiving device 2 can be determined based on the number of the successive power transmission coils L1 for which large weighting values are set.

Further, if there are a plurality of groups of the successive power transmission coils L1 for which large weighting values are set, it can be determined that a plurality of power receiving devices 2 are placed on the placing portion PL.

Seventh Embodiment

A contactless power transmission system according to a seventh embodiment of the present invention is characterized by detecting the inductances of the respective power transmission coils L1 based on voltages of feedback coils magnetically coupled to the respective power transmission coils L1. In this embodiment, the same elements as in the first to sixth embodiments are not described.

Figure 19:
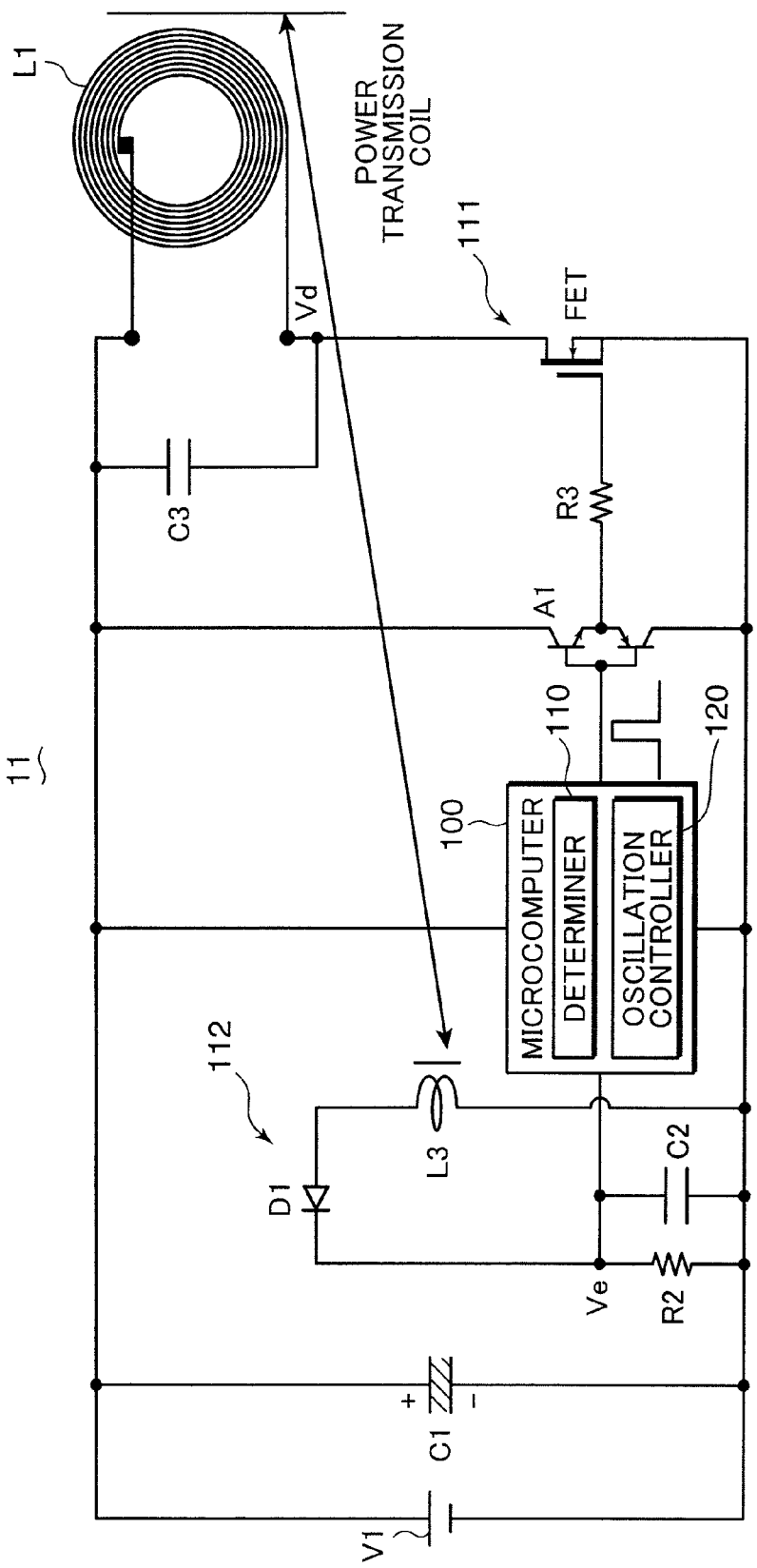
FIG. 19 is a circuit diagram showing one current supply circuit and a microcomputer according to a fourth embodiment of the invention.

FIG. 19 is a circuit diagram showing one current supply circuit 11 and a microcomputer 100 in the seventh embodiment of the present invention. As shown in FIG. 19, a detector 112 includes the feedback coil L3, a diode D1, a resistor R2 and a capacitor C2.

The feedback coil L3 has one end thereof connected to the resistor R2 via the diode D1 and the other end thereof grounded and is magnetically coupled to the power transmission coil L1. The diode D1 prevents the flow of a current from the diode D1 toward a ground via the feedback coil L3.

Thus, a voltage Ve at a connection point between the diode D1 and the resistor R2 is input to the microcomputer 100. If the voltage of the power transmission coil L1 changes, the voltage of the feedback coil L3 also changes according to this change and the voltage Ve also changes according to the voltage of the feedback coil L3. Therefore, the determiner 110 can determine whether or not the position of the placing portion PL right above the power transmission coil L1 corresponding to each voltage Ve is the placed position using the voltage Ve.

As described above, since a plurality of feedback coils L3 magnetically coupled to the respective power transmission coils L1 are provided according to the contactless power transmission system of this embodiment, the voltages of the feedback coils L3 can be reduced by adjusting the numbers of turns of the feedback coils L3 and the power transmission coils L1.

For example, if the power transmitting device 1 is driven by being connected to a commercial power supply of AC 100V, a voltage of about DC 140V is, for example, output from the capacitor C1. Thus, the voltage Vd also increases and circuit elements with high pressure resistance need to be adopted as those for constructing the detector 112 in the construction of FIG. 2. However, since the feedback coils L3 are provided in this embodiment, a diode, a resistor and a capacitor with low pressure resistance can be used as the diode D1, the resistor R2 and the capacitor C2 as circuit elements for constructing the detector 112 and a cost reduction can be promoted.

Eighth Embodiment

A contactless power transmission system according to an eighth embodiment is characterized by arranging power transmission coils L1 in a right triangular pattern. In this embodiment, the same elements as in the first to seventh embodiments are not described. Further, the one shown in FIG. 2 or 19 may be used as a circuit supply circuit 11.

Figure 20:
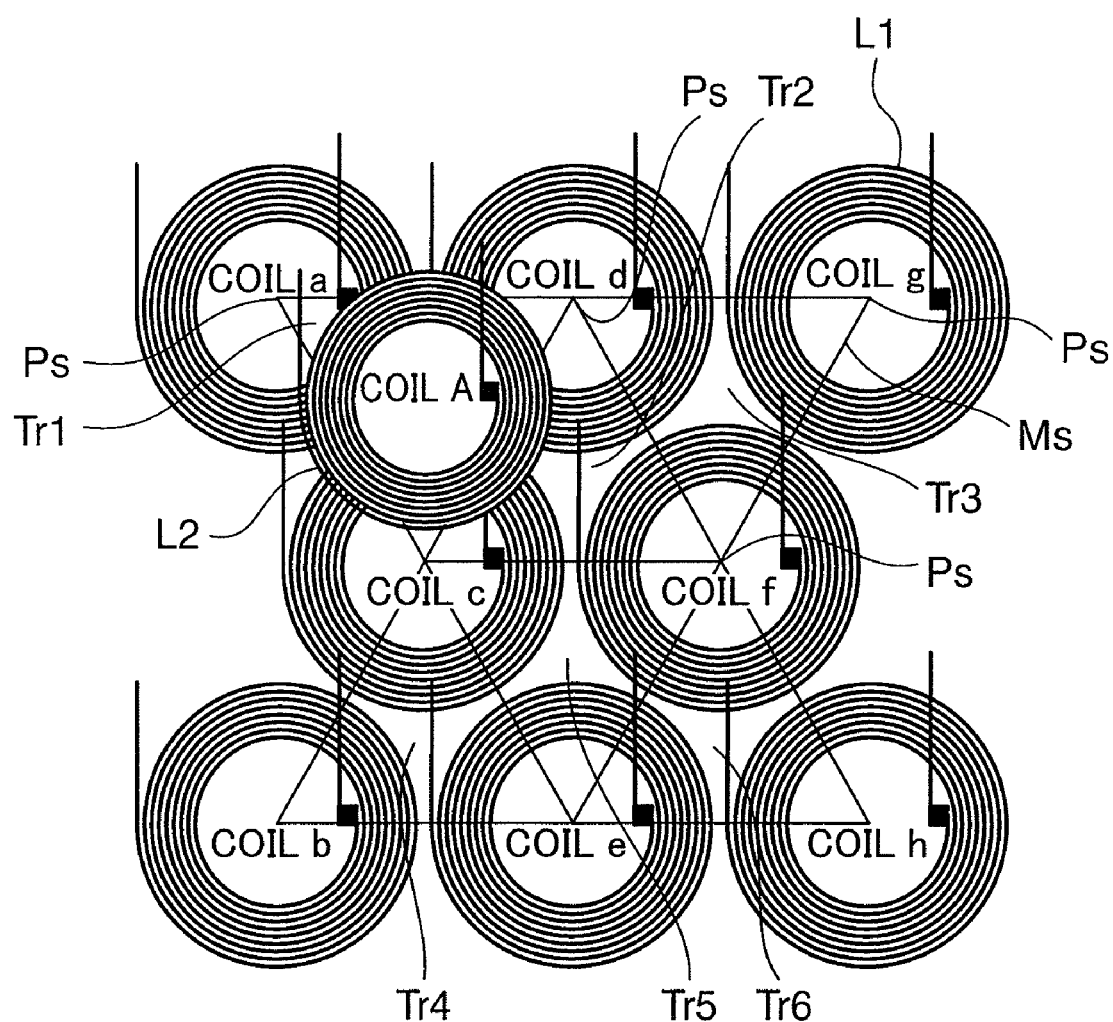
FIG. 20 is an arrangement diagram of power transmission coils of a contactless power transmission system according to a fifth embodiment of the invention, FIG. 21 are waveform charts showing switching voltages output by the oscillation controller when a coil A was placed right above coils a, c, d as shown in FIG. 20, FIG. 22 are waveform charts showing switching voltages output by the oscillation controller in the case of employing a frequency changing technique when the coil A was placed right above coils a, c, d as shown in FIG. 20.

FIG. 20 is an arrangement diagram of the power transmission coils 11 of the contactless power transmission system according to the eighth embodiment of the present invention. As shown in FIG. 20, the power transmission coils L1 are arranged such that centers CT1 (not shown) thereof are located at vertices Ps of a right-triangular mesh Ms in this embodiment.

The mesh Ms is such that three right triangles are arranged in each of two upper and lower levels. Hereinafter, the first to third right triangles from left in the first level are respectively referred to as right triangles Tr1 to Tr3 and the first to third right triangles from left in the second level as right triangles Tr4 to Tr6.

In the mesh Ms, three vertices Ps are arranged in the first row, two vertices Ps are arranged in the second row and three vertices Ps are arranged in the third row, whereby a total of eight vertices Ps are arranged.

Accordingly, in this embodiment, three power transmission coils L1 are arranged in the first and third rows and two power transmission coils L1 are arranged in the second row, whereby a total of eight power transmission coils are arranged. In FIG. 20, the three power transmission coils L1 in the first row are referred to as coils a, d, g, the two power transmission coils in the second row as coils c, f and the three power transmission coils L1 in the third row as coils b, e, h.

In this embodiment, the oscillation controller 120 shown in FIG. 2 or 19 outputs switching voltages of three phases shifted from each other by 120° to switching elements FET corresponding to these respective power transmission coils L1 so that the currents of three phases shifted from each other by 120° flow into three power transmission coils L1 arranged at the vertices Ps of the right triangle, to which the power transmission coil L1 arranged below the placed position determined by the determiner 110 belongs.

In FIG. 20, the coil A is placed right above the coils a, c, d. Thus, the determiner 110 determines the position of the placing portion PL right above the coils a, c, d as the placed position of the power receiving device 2.

Accordingly, the oscillation controller 120 outputs switching voltages of three phases shifted from each other by 120° to the switching elements FET corresponding to the coils a, c, d arranged at the vertices of the right triangle Tr1, to which the coils a, c, d as the power transmission coils L1 below the placed position belong.

The vertex Ps where the coil d is arranged belongs to the right triangles Tr1 to Tr3, and the vertex Ps where the coils c is arranged belongs to the right triangles Tr1, Tr2, Tr4 and Tr5. However, since it is determined that the power receiving device 2 is placed right above the coils a, c, d arranged at all the vertices Ps of the right triangle Tr1, the oscillation controller 120 specifies the coils a, c, d arranged at the vertices of the right triangle Tr1 as the power transmission coils L1 to be oscillated.

Figure 21:
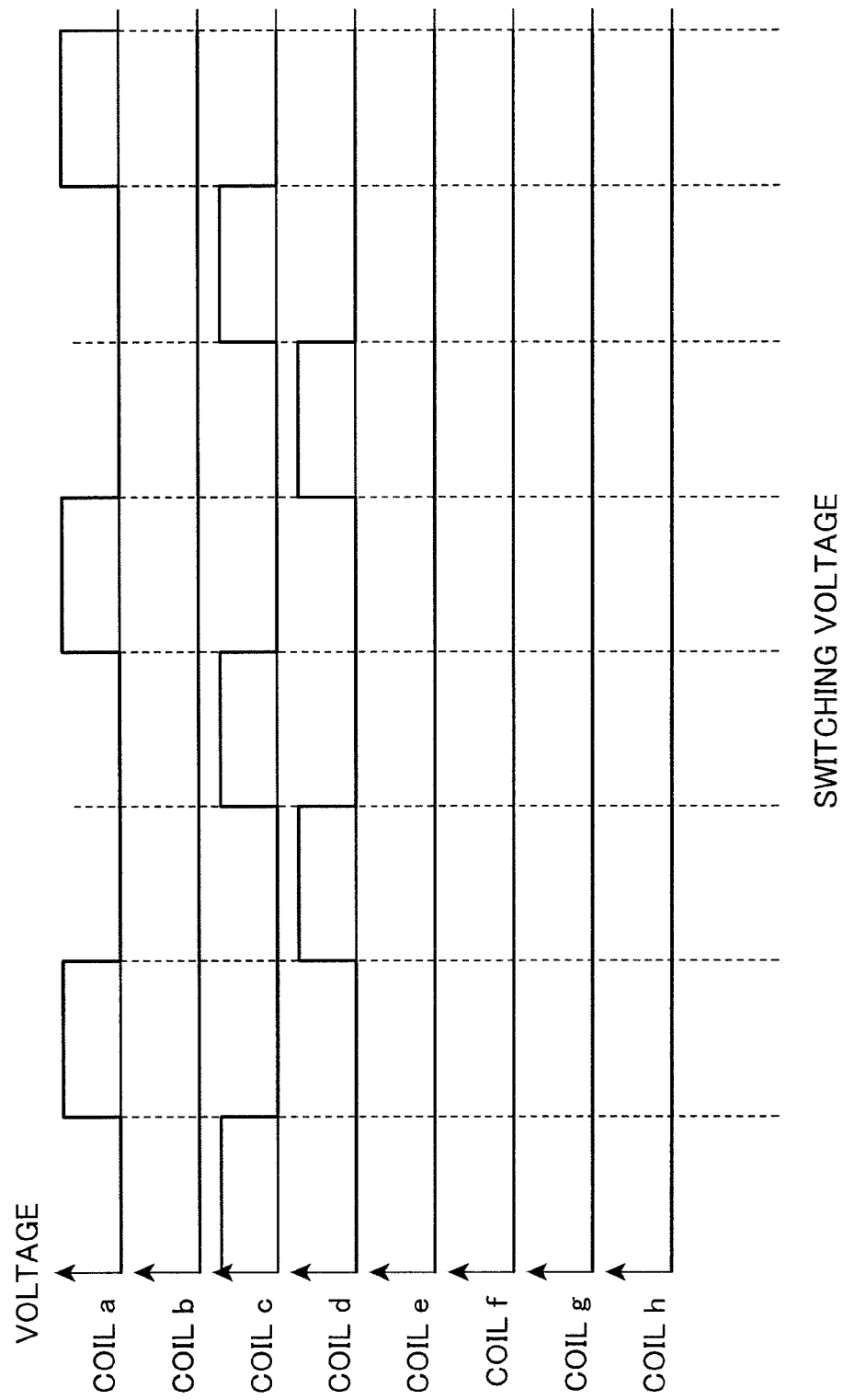

FIG. 21 are waveform charts showing switching voltages output by the oscillation controller 120 when the coil A was placed right above the coils a, c, d as shown in FIG. 20. In the case of FIG. 20, the oscillation controller 120 specifies the coils a, c, d as the power transmission coils L1 to be oscillated. Thus, the oscillation controller 120 retards the phase of the switching voltage for the coil d adjacent to and to the right of the coil a by 120° with respect to the switching voltage for the coil a as shown in FIG. 21.

Further, the oscillation controller 120 retards the phase of the switching voltage for the coil c with respect to the switching voltage for the coil d by 120°.

Thus, even if the coil A is placed near the center of gravity of the right triangle Tr1 shown in FIG. 20, magnetic fluxes can be interlinked with this coil A and power can be transmitted to the power receiving device 2.

Although the switching voltages of three phases shifted from each other by 120° are output to the coils arranged at the three vertices of the right triangle in the above description, the frequency changing technique described in the third embodiment or the current magnitude changing technique described in the fourth embodiment may be employed without being limited to the above.

In the case of employing the frequency changing technique, currents whose frequencies differ at a ratio of 1:m:n may flow into the respective power transmission coils L1 arranged at the three vertices of the right triangle. Further, in the case of employing the current magnitude changing technique, currents whose magnitudes differ at a ratio of 1:m:n may flow into the respective power transmission coils L1 arranged at the three vertices of the right triangle. Here, m and n are, for example, numbers other than 1 (e.g. integers equal to or greater than 2).

Figure 22:
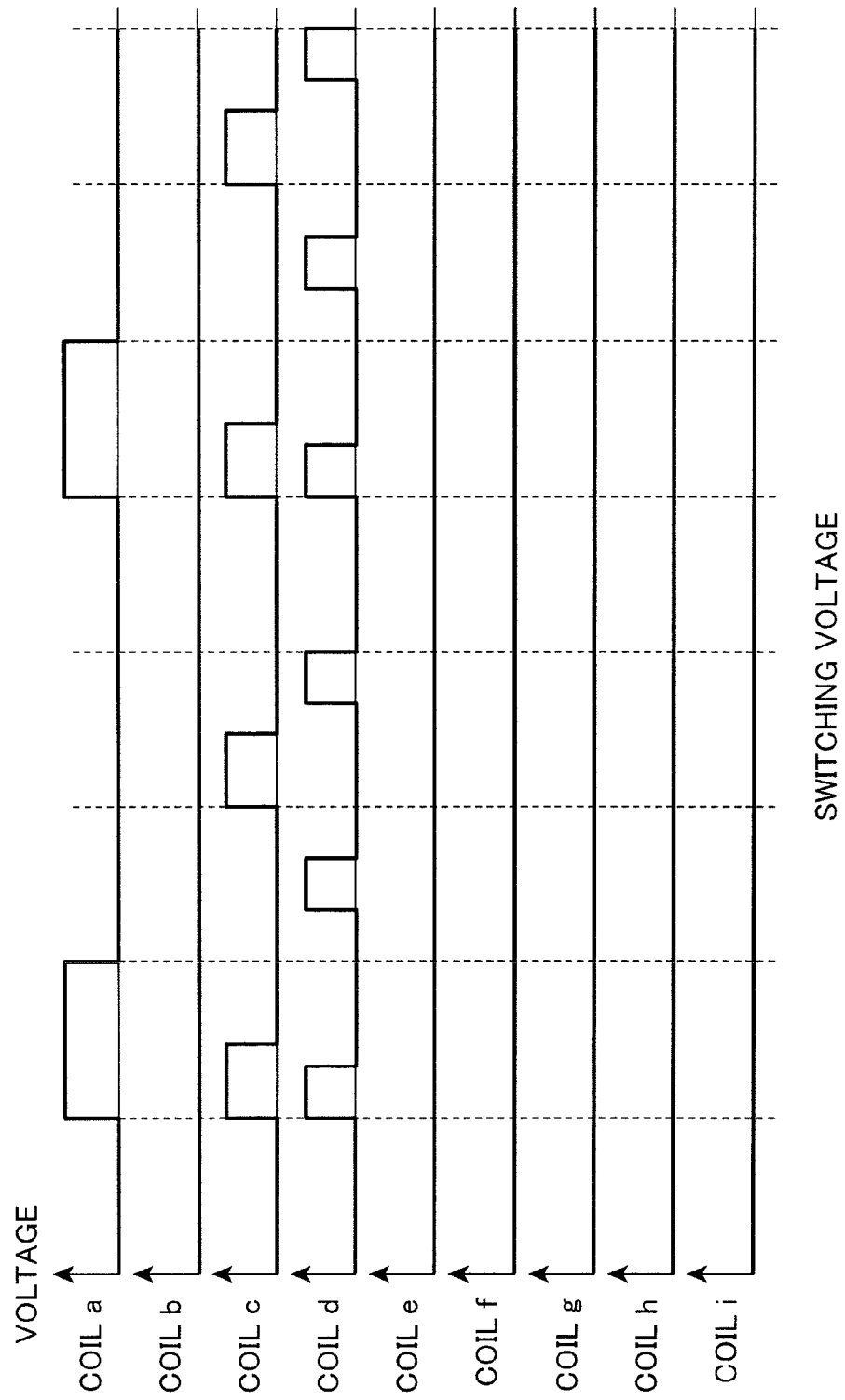

FIG. 22 are waveform charts showing switching voltages output by the oscillation controller 120 in the case of employing the frequency changing technique when the coil A was placed right above the coils a, c, d as shown in FIG. 20.

As shown in FIG. 22, the coils a, c, d are respectively driven by the switching voltages whose frequencies are at the ratio of 1:m:n. Thus, currents whose frequencies are shifted from each other flow into the coils a, c, d and magnetic flux densities at the centers of gravity of the respective right triangles can be made uniform.

Ninth Embodiment

Figure 23:
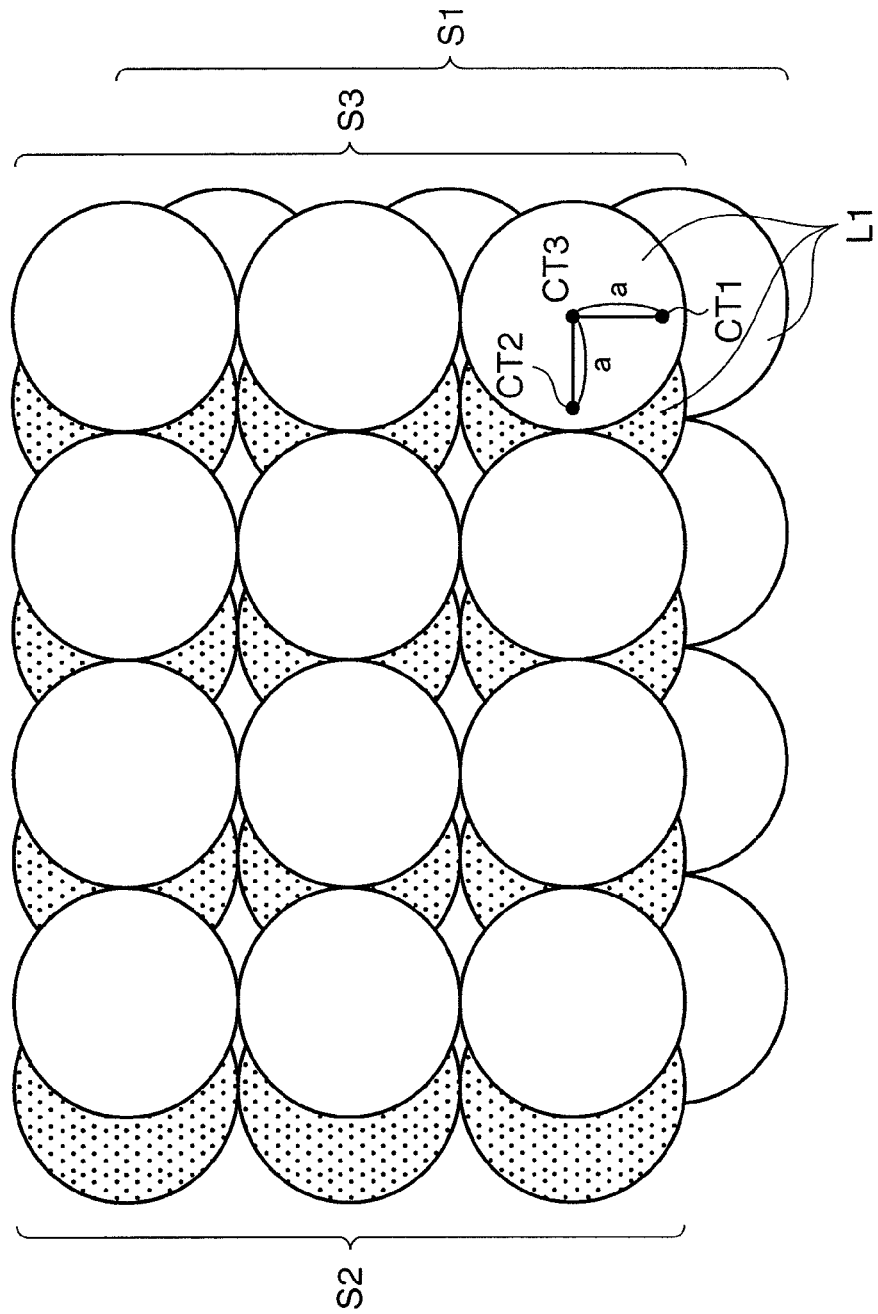
FIG. 23 is an arrangement diagram of power transmission coils according to a sixth embodiment of the invention.

A contactless power transmission system according to a ninth embodiment of the present invention is characterized by arranging power transmission coils L1 in such a layered manner that centers thereof are displaced from each other. FIG. 23 is an arrangement diagram of the power transmission coils L1 according to the ninth embodiment of the present invention. In this embodiment, the same elements as in the first to eighth embodiments are not described.

As shown in FIG. 23, the power transmission coils L1 are arranged in three sheets S1 to S3. The sheets S1 to S3 are formed by coil sheets in which the power transmission coils L1 are arranged in an M×N matrix pattern (3×4 matrix pattern in FIG. 23).

In each of the sheets S1 to S3, vertical and horizontal arrangement pitches of the power transmission coils L1 are equal.

The sheets S1 to S3 are so laminated as to displace the centers of the power transmission coils L1. In FIG. 23, centers CT1 of the power transmission coils L1 of the sheet S1 are displaced downward by "a" with respect to centers CT3 of the power transmission coils L1 of the sheet S3 and centers CT2 of the power transmission coils L1 of the sheet S2 are displaced to the left by "a" with respect to centers CT3 of the power transmission coils L1 of the sheet S3.

A displacement pattern of the sheets S1 to S3 of FIG. 23 is an example and another displacement pattern may be employed.

As described above, since the sheets S1 to S3 are so laminated as to displace the centers of the power transmission coils L1, the occurrence of a position where magnetic fluxes cancel out each other and magnetic fluxes interlinked with the coil A become 0 can be more reliably prevented right above the power transmission coils L1 to be oscillated. Thus, regardless of at which position of the placing portion PL the coil A is placed, magnetic fluxes can be interlinked with the coil A. Therefore, power can be reliably transmitted to the power receiving device 2 while power saving is promoted.

Tenth Embodiment

A contactless power transmission system according to a tenth embodiment is characterized by intermittently oscillating all the power transmission coils L1 when the power receiving device 2 is not placed above the placing portion PL. In this embodiment, the same elements as in the first to ninth embodiments are not described. Further, the one shown in FIG. 2 or 19 may be used as a current supply circuit 11.

In this embodiment, the oscillation controller 120 shown in FIG. 2 or 19 outputs switching voltages to intermittently oscillate all the power transmission coils L1 when the determiner 110 determines that the power receiving device 2 is placed right above none of the power transmission coils L1. Here, the oscillation controller 120 may intermittently oscillate the power transmission coils L1 by outputting the same switching voltages as those output for intermittent oscillation in the fifth embodiment to the respective switching elements FET.

By doing so, the detector 112 can detect the placement of a power receiving device 2 if the power receiving device 2 is placed anew in a state where no power receiving device 2 is placed above the placing portion PL.

As described above, according to the contactless power transmission system of this embodiment, the respective power transmission coils L1 are intermittently oscillated when no power receiving device 2 is placed above the placing portion PL. Thus, it is possible to reduce standby power and, simultaneously, detect the placement of the power receiving device 2.

Eleventh Embodiment

A contactless power transmission system according to an eleventh embodiment of the present invention is characterized by making the size of the power transmission coils L1 larger than that of the power receiving coil L2 (size of the power transmission coils L1>size of the power receiving coil L2). If the size of the power receiving coil L2 is set several times as large as that of the power transmission coils L1 to make the size of the power receiving coil L2 larger than that of the power transmission coils L1 (size of the power receiving coil L2>size of the power transmission coils L1), the power receiving coil L2 can be located right above a plurality of power transmission coils L1, thereby being able to prevent magnetic fluxes interlinked with the power receiving coil L2 from becoming 0.

However, if a relatively small-size device such as an electric toothbrush is adopted as the power receiving device 2, the diameter of the power receiving coil L2 is about 10 mm. Thus, the diameter of the power transmission coils L1 needs to be about 5 mm if the size of the power receiving coil L2 is made larger than that of the power transmission coils L1.

However, there is a gap of about 3 mm to 4 mm caused by the housings of the power transmitting device 1 and the power receiving device 2, interlinking magnetic fluxes may not be possibly generated for the power receiving coil L2 placed 3 to 4 mm before if the diameter of the power transmission coils L1 is about 5 mm. Thus, by making the size of the power transmission coils L1 larger than that of the power receiving coil L2, even if a small-size device is adopted as the power receiving device 2, magnetic fluxes can be interlinked with the power receiving coil L2 and power can be transmitted to the power receiving device 2.

However, if the size of the power transmission coils L1 is made larger than that of the power receiving coil L2, a position is present where magnetic fluxes interlinked with the power receiving coil L2 become 0 as shown in FIG. 16. However, the magnetic fluxes can be interlinked with the power receiving coil L2 regardless of the placed position of the power receiving coil L2 as shown in FIG. 17 by mutually shifting the phases of currents to flow into a plurality of power transmission coils L1 to be oscillated described in the first and other embodiments.

Therefore, power can be transmitted regardless of the placed position of the power receiving device 2 even if a small-size device such as an electric toothbrush is adopted as the power receiving device 2.

Twelfth Embodiment

Figure 24:
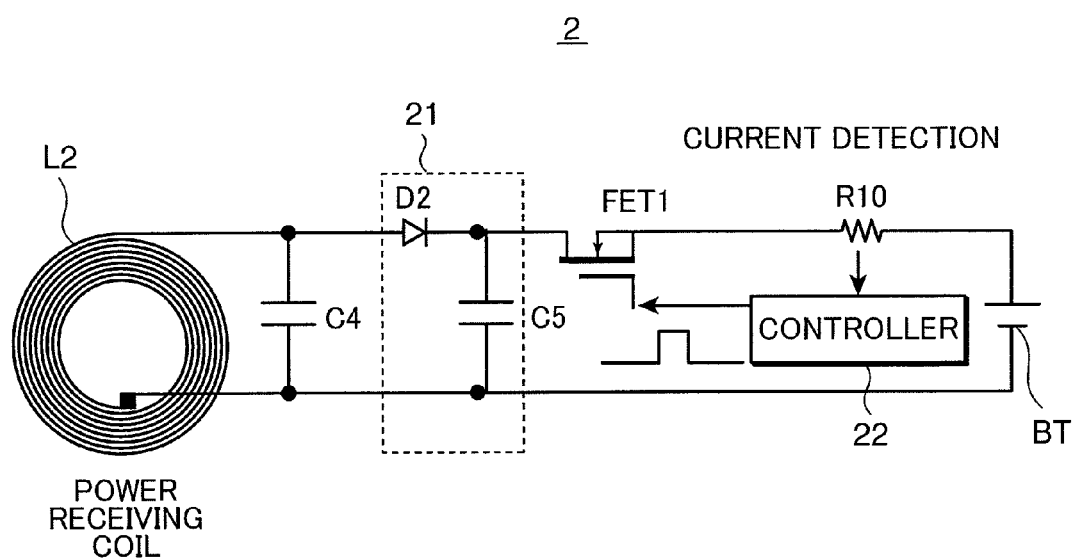
FIG. 24 is a circuit diagram of a power receiving device according to a ninth embodiment of the invention.

A contactless power transmission system according to a twelfth embodiment of the present invention is characterized by charging the secondary battery BT with a constant current in the contactless power transmission system according to any one of the first to eleventh embodiments. In this embodiment, the same elements as in the first to eleventh embodiments are not described. FIG. 24 is a circuit diagram of a power receiving device 2 according to the twelfth embodiment of the present invention. As shown in FIG. 24, the power receiving device 2 is provided with a power receiving coil L2, a rectifying circuit 21, a capacitor C4, a switching element FET1, a resistor R10 and a controller 22.

The rectifying circuit 21 includes a diode D1 having an anode thereof connected to one end of the capacitor C4 and a capacitor C5 having one end thereof connected to a cathode of the diode D2 and the other end thereof connected to a negative electrode of the secondary battery BT. The functions of the diode D2 are not described since being the same as those of the one shown in FIG. 3. The capacitor C5 is a smoothing capacitor.

The capacitor C4 is a matching capacitor connected in parallel to the power receiving coil L2 and provided to receive a larger amount of power from a power transmitting device 1.

The switching element FET1 is constructed, for example, by an n-channel field-effect transistor having a drain thereof connected to the cathode of the diode D2 and a source thereof connected to a positive electrode of the secondary battery BT via the resistor R10, and is turned on and off in accordance with a PWM signal output from the controller 22.

The controller 22 detects a current flowing in the resistor R10 and PWM-controls the switching element FET1 by outputting a PWM signal to a gate of the switching element FET1 so that the current becomes constant.

Figures 25A, 25B:
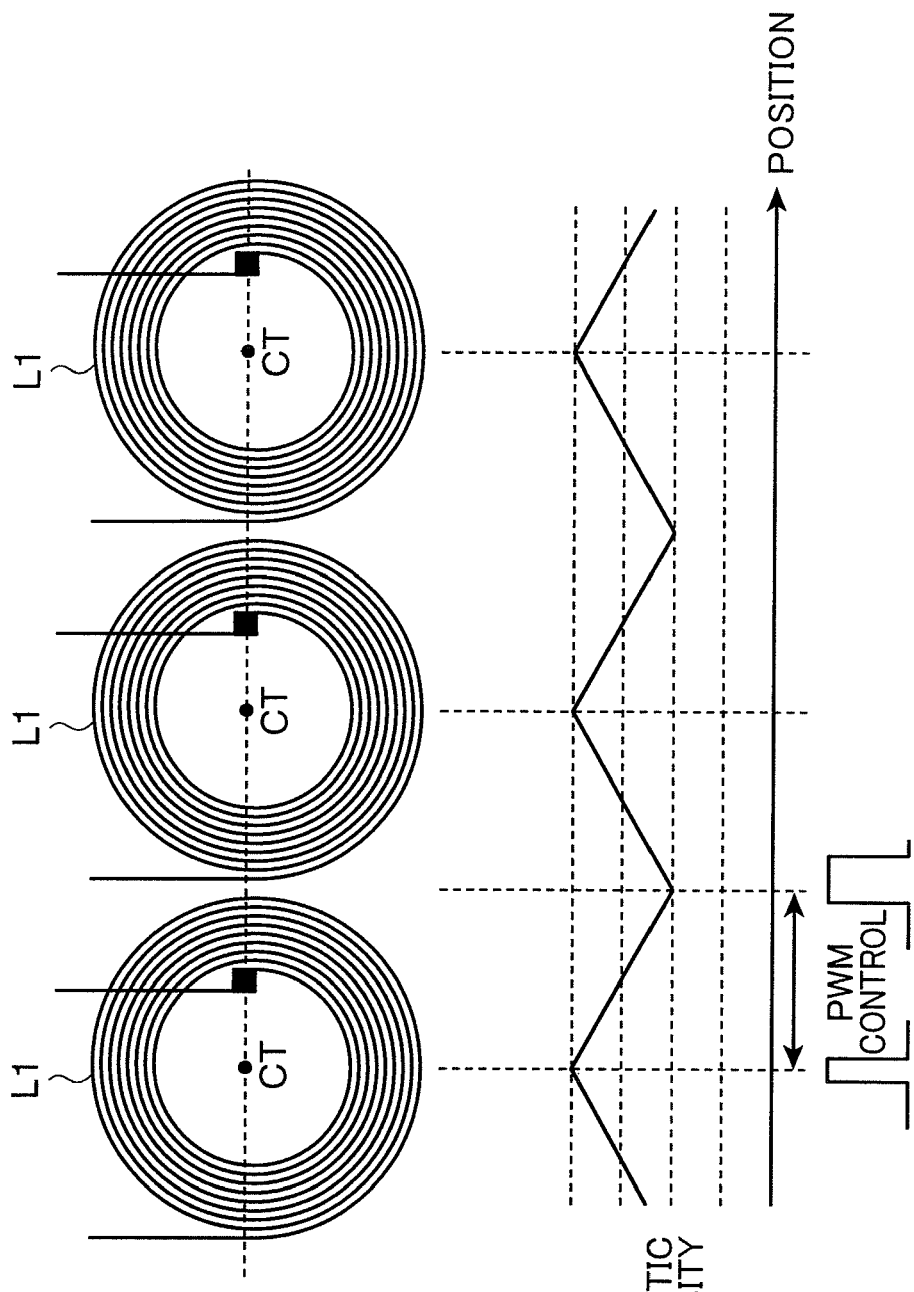
FIG. 25A is a diagram showing three neighboring power transmission coils and FIG. 25B is a graph showing a magnetic flux density distribution of the three power transmission coils shown in FIG. 25A.

FIG. 25A shows three adjacent power transmission coils L1 and FIG. 25B is a graph showing a magnetic flux distribution of the three power transmission coils L1 shown in FIG. 25A. In FIG. 25B, a vertical axis represents the magnetic flux density and a horizontal axis represents positions on a straight line connecting centers CT of the three power transmission coils L1 shown in FIG. 25A.

It is understood that the magnetic flux changes in a serrated manner to reach peaks at the centers CT and reach troughs at midpoints of line segments connecting the adjacent centers CT as shown in FIG. 25B.

Accordingly, when the power receiving coil L2 is placed right above the center CT, the controller 22 shortens an ON-period of the switching element FET1 by reducing the duty ratio of the PWM signal since the magnetic flux density is high and a large amount of power is supplied. On the other hand, when the power receiving coil L2 is placed right above the midpoint between the adjacent centers CT, the controller 22 extends the ON-period of the switching element FET1 by increasing the duty ratio of the PWM signal since the magnetic flux density is low and a smaller amount of power is supplied. Thus, a constant current is, on the average, supplied to the secondary battery BT, whereby the secondary battery BT is charged with a constant current.

Thirteenth Embodiment

A contactless power transmission system according to a thirteenth embodiment of the present invention is characterized by changing power to be transmitted to the power receiving device 2 according to the size of the power receiving device 2 placed on the placing portion PL. In this embodiment, the same elements as in the first to twelfth embodiments are not described. Either the one shown in FIG. 2 or the one shown in FIG. 9 may be used as a current supply circuit 11.

In this embodiment, the determiner 110 shown in FIGS. 2 and 19 sets weighting values for the power transmission coil L1 by linear interpolation as in the third embodiment and specifies how many power receiving devices 2 are placed from a distribution of the weighting values.

Figure 26:
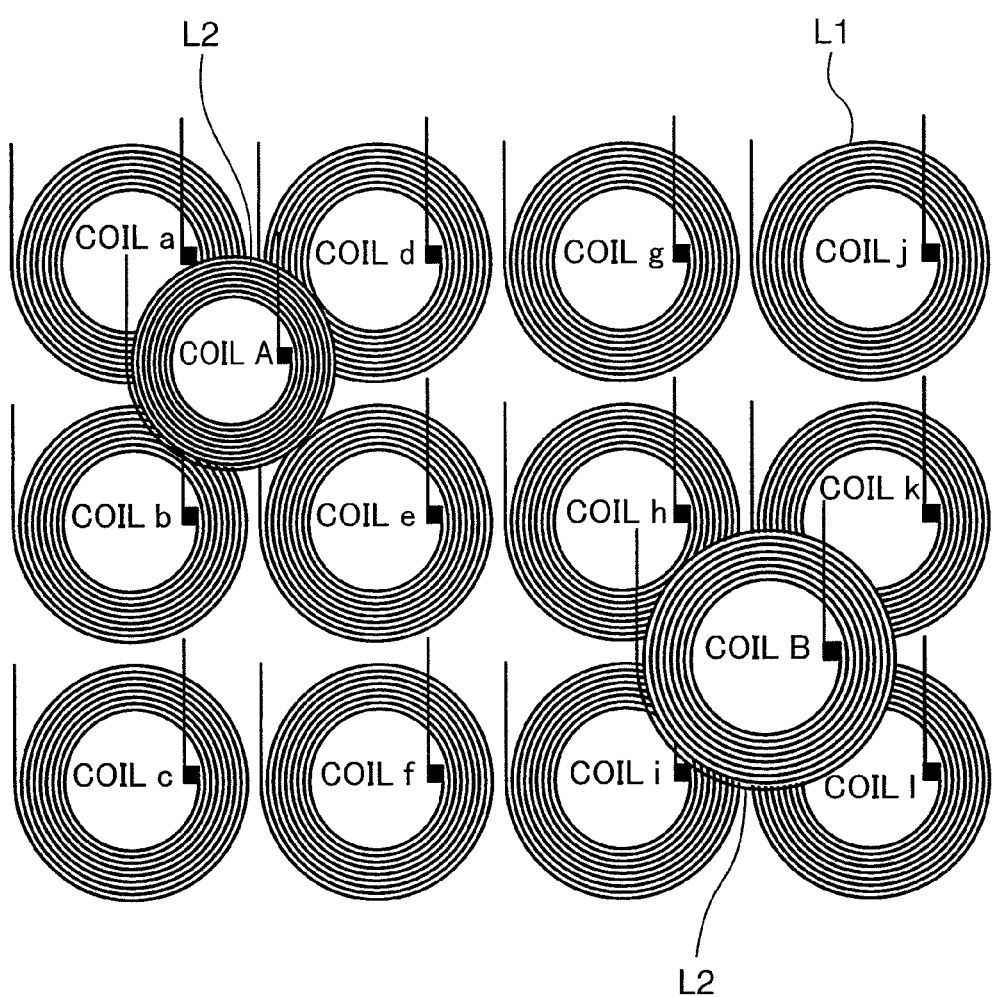
FIG. 26 is a diagram showing power transmission coils and power receiving coils when two power receiving devices are placed above a placing portion.

FIG. 26 shows power transmission coils L1 and power receiving coils L2 when two power receiving devices 2 are placed on the placing portion PL. In FIG. 26, a coil A as the power receiving coil L2 of the first power receiving device 2 is placed above coils a, b, d, e and a coil B as the power receiving coil L2 of the second power receiving device 2 is placed above coils h, i, k, l.

In this case, it is assumed that the determiner 110 sets weighting values as follows for the coils a, b, d, e and the coils h, i, k, l by linearly interpolating voltages Ve corresponding to the respective power transmission coils L1.
a: 0.4, b: 0.2, d: 0.3, e: 0.1
h: 0.3, i: 0.4, k: 0.5, l: 0.7

Then, the determiner 110 determines the coils a, b, d, e as a group of the power transmission coils L1 since a distribution of the weighting values for the coils a, b, d, e forms one bundle and determines the coils h, i, k, l as a group of the power transmission coils L1 since distribution of the weighting values for the coils h, i, k, l forms one bundle.

Subsequently, the determiner 110 calculates a total value of the weighting values for the power transmission coils L1 of each group and sets this total value as the weighting value for the power transmission coil having the maximum weighting value in each group.

In the case of FIG. 26, the total value of the weighting values is 0.4+0.2+0.3+0.1=1 in the group of the coils a, b, d, e and the determiner 110 gives 1.0 as the weighting value for the coil a since the weighting value of the coil a is largest. In the group of the coils h, i, k, l, the total value of the weighting values is 0.3+0.4+0.5+0.7=1.9 and the determiner 110 gives 1.9 as the weighting value for the coil l since the weighting value of the coil l is largest.

Then, when the weighting value given to the power transmission coil L1 having the largest weighting value in one group is equal to or larger than a threshold value, the determiner 110 determines that the large power receiving device 2 is placed right above this power transmission coil L1. On the other hand, when the weighting value given to the power transmission coil L1 having the largest weighting value in one group is smaller than the threshold value, the determiner 110 determines that the small power receiving device 2 is placed right above this power transmission coil L1.

In the case of FIG. 26, if the threshold value is assumed to be 1.5, it is determined that the small power receiving device 2 is placed right above the coil a since the weighting value given to the coil a is 1.0 and smaller than the threshold value. On the other hand, it is determined that the large power receiving device 2 is placed right above the coil 1 since the weighting value given to the coil 1 is 1.9 and larger than the threshold value.

The oscillation controller 120 specifies each power transmission coil L1, to which the weighting value was given by the determiner 110, and the power transmission coil L1 having the weighting value next to that of the former power transmission coil L1 out of the power transmission coils L1 adjacent to the former power transmission coil L1 as the power transmission coils L1 to be oscillated.

In FIG. 26, since, out of the coils a, b, d, e, the weighting value for the coil a is largest and the power transmission coil L1 having the second largest weighting value is the coil d, the coils a, d are specified as the power transmission coils L1 to be oscillated. Further, since, out of the coils h, i, k, l, the weighting value for the coil l is largest and the power transmission coil L1 having the second largest weighting value is the coil k, the coils l, k are specified as the power transmission coils L1 to be oscillated.

Then, the oscillation controller 120 outputs switching voltages so that currents whose phases are shifted from each other by 90° flow into the two adjacent power transmission coils L1 specified as the power transmission coils L1 to be oscillated in each group.

In this case, the oscillation controller 120 may output the switching voltages so that more currents flow into the two adjacent power transmission coils L1, above which the large power receiving device 2 is placed, than into the two adjacent power transmission coils L1, above which the small power receiving device 2 is placed.

Specifically, the oscillation controller 120 may set the duty ratios of the switching voltages for the two adjacent power transmission coils L1, above which the large power receiving device 2 is placed, larger than those of the switching voltages for the two adjacent power transmission coils L1, above which the small power receiving device 2 is placed.

In the case of FIG. 26, the oscillation controller 120 outputs the switching voltages so that currents whose phases are shifted from each other by 90° flow into the coils a, d. Further, the oscillation controller 120 outputs the switching voltages so that currents whose phases are retarded by 90° flow into the coils l, k.

Since the small power receiving device 2 is placed above the coils a, d and the large power receiving device 2 is placed above the coils l, k, the oscillation controller 120 may set the duty ratios of the switching voltages for the coils a, d smaller than those of the switching voltages for the coils l, k.

Figure 27:
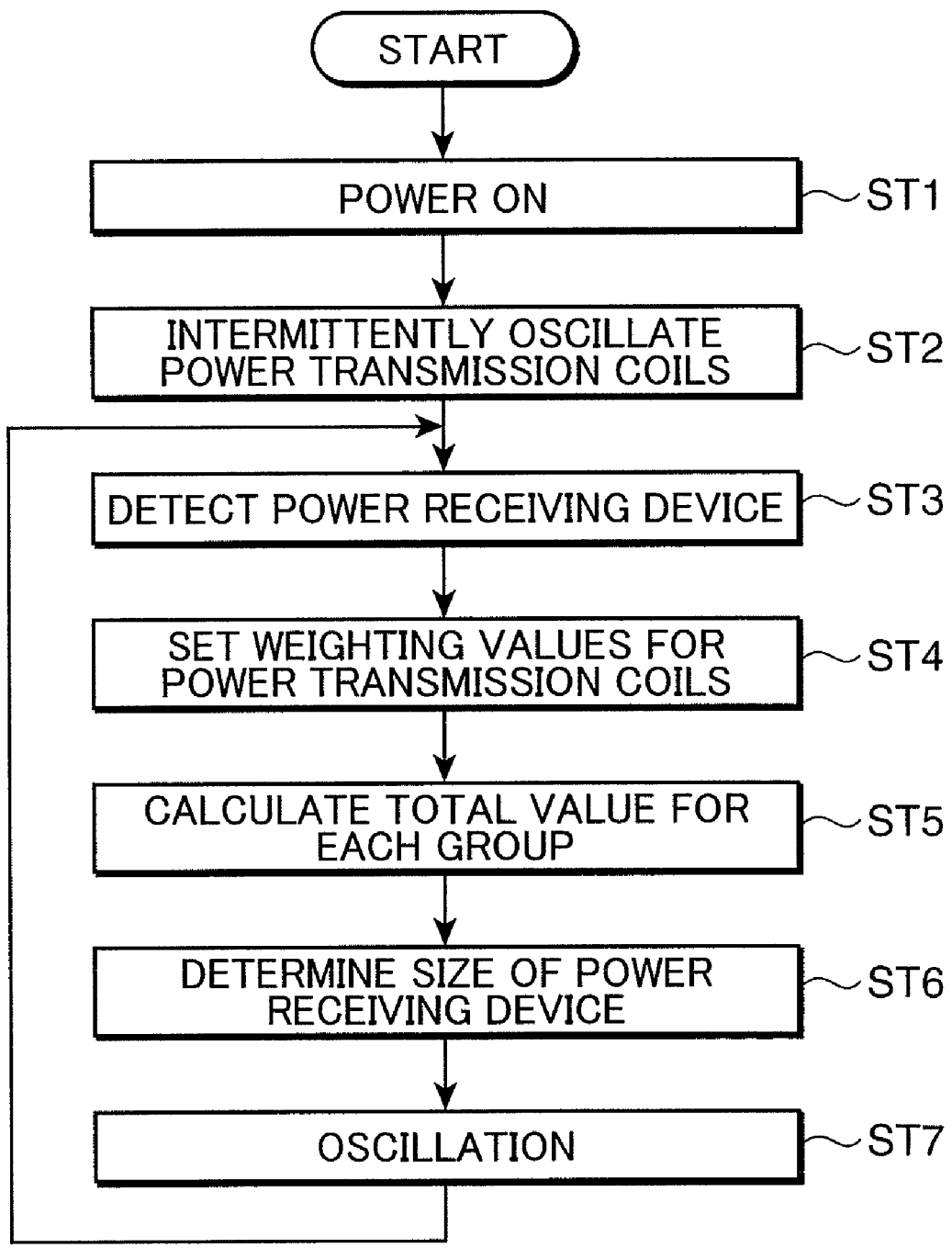
FIG. 27 is a flow chart showing the operation of a contactless power transmission system according to a tenth embodiment of the invention.

FIG. 27 is a flow chart showing the operation of the contactless power transmission system according to the thirteenth embodiment of the present invention. First of all, when the system is turned on (Step ST1), the microcomputer 100 intermittently outputs switching voltages to intermittently oscillate the respective power transmission coils L1 (Step ST2).

Subsequently, upon detecting the placement of the power receiving devices 2 (Step ST3), the determiner 110 sets the weighting values for the respective power transmission coils L1 (Step ST4) and calculates the total value of the weighting values for each group of the power transmission coils L1 (Step ST5).

Subsequently, the determiner 110 specifies the power transmission coil L1 having the largest weighting value for each group of the power transmission coils L1 and determines which of the large and small power receiving devices 2 is placed right above the power transmission coil L1 having the largest weighting value using the total value of the weighting values (Step ST6).

Subsequently, the oscillation controller 120 specifies the two power transmission coils L1, i.e. the power transmission coil L1 having the largest weighting value in each group and the power transmission coil L1 having the weighting value next to that for the former power transmission coil L1 out of the power transmission coils L1 adjacent to the former power transmission coil L1 as the power transmission coils L1 to be oscillated, oscillates these power transmission coils L1 while mutually shifting the phases from each other by 90°, and intermittently oscillate the power transmission coils L1 other than those to be oscillated (Step ST7). Then, this process is returned to Step ST3.

As described above, according to the contactless power transmission system of this embodiment, it is possible to transmit more power to the large power receiving device 2 and less power to the small power receiving device 2, wherefore power can be efficiently transmitted to the power receiving devices 2.

Further, even if a plurality of power receiving devices 2 are placed, suitable powers can be transmitted to the respective power receiving devices 2 according to the sizes of the respective power receiving devices 2.

Technical features of the present invention are summarized as follows.

(1) A contactless power transmission system according to one aspect of the present invention comprises a power transmitting device including power transmission coils for transmitting power; and a power receiving device including a power receiving coil to be magnetically coupled to the power transmission coils, wherein the power transmitting device includes a placing portion, on which the power receiving device is to be placed, a plurality of power transmission coils arranged below the placing portion, an oscillator for oscillating the respective power transmission coils while separately exciting them, a detector for detecting the inductances of the respective power transmission coils, and a determiner for determining the placed position of the power receiving device on the placing portion based on the inductances of the respective power transmission coils detected by the detector; and the oscillator specifies a plurality of power transmission coils to be oscillated based on the placed position determined by the determiner and sets parameters of currents to flow into the respective power transmission coils so as to mutually shift the waveforms of currents to flow into the plurality of specified power transmission coils.

According to this construction, the inductances of the respective power transmission coils are detected, the placed position of the power receiving device is determined based on the detected inductances, the plurality of power transmission coils to be oscillated are specified based on the determined placed position, the parameters of the currents to flow into the respective power transmission coils are so set as to mutually shift the waveforms of the currents to flow into the plurality of specified power transmission coils, and these plurality of power transmission coils are oscillated.

Thus, regardless of at which position on the placing portion the power receiving device is placed, there is no position on the placing portion right above the power transmission coils to be oscillated where magnetic fluxes generated by the plurality of power transmission coils cancel out and magnetic fluxes interlinked with the power receiving coil become 0, wherefore the power receiving device can be reliably charged.

Further, since the plurality of power transmission coils to be oscillated are specified based on the placed position of the power receiving device, only the power transmission coils contributing to contactless charging are oscillated and those not contributing are not oscillated, with the result that power saving can be promoted.

Furthermore, power saving can be promoted by a simple control of setting the parameters of the currents respectively flowing into the plurality of power transmission coils to be oscillated.

Which position of the placing portion is the placed position of the power receiving device is determined based on the inductances of the power transmission coils. Thus, the placed position can be determined even without specially providing communication means for determining the placed position, wherefore the system can be simplified and the cost thereof can be reduced.

(2) The oscillator preferably specifies the plurality of power transmission coils to be oscillated based on the placed position determined by the determiner and mutually shifts the phases of the currents to flow into the plurality of specified power transmission coils.

According to this construction, the power receiving device can be reliably charged by a simple control of mutually shifting the phases of the currents to flow into the plurality of power transmission coils to be oscillated.

(3) The oscillator preferably specifies the plurality of power transmission coils to be oscillated based on the placed position determined by the determiner and changes the frequencies of the currents to flow into the plurality of specified power transmission coils.

According to this construction, the power receiving device can be reliably charged by a simple control of changing the frequencies of the currents to flow into the plurality of power transmission coils to be oscillated.

(4) The oscillator preferably specifies the plurality of power transmission coils to be oscillated based on the placed position determined by the determiner and changes the magnitudes of the currents to flow into the plurality of specified power transmission coils.

According to this construction, the power receiving device can be reliably charged by a simple control of changing the magnitudes of the currents to flow into the plurality of power transmission coils to be oscillated.

(5) It is preferable that the plurality of power transmission coils are arranged in a reticular pattern; and that the oscillator causes currents of two phases shifted from each other by 90° to flow into adjacent ones of the plurality of power transmission coils to be oscillated.

According to this construction, since the phases of the currents to flow into the adjacent power transmission coils are shifted from each other by 90°, a magnetic flux density on the placing portion can be made substantially uniform and the power receiving device can be charged regardless of at which position of the placing portion the power receiving device is placed.

(6) It is preferable that the plurality of power transmission coils are arranged in a reticular pattern; and that the oscillator causes different currents whose frequencies are at a ratio of 1:m (m>0) to flow into adjacent ones of the plurality of power transmission coils to be oscillated.

According to this construction, since the different currents whose frequencies are at the ratio of 1:m (m>0) flow into the adjacent power transmission coils, a magnetic flux density on the placing portion can be made substantially uniform and the power receiving device can be charged regardless of at which position of the placing portion the power receiving device is placed.

(7) It is preferable that the plurality of power transmission coils are arranged in a reticular pattern; and that the oscillator causes different currents whose magnitudes are at a ratio of 1:m (m>0) to flow into adjacent ones of the plurality of power transmission coils to be oscillated.

According to this construction, since the different currents whose magnitudes are at the ratio of 1:m (m>0) flow into the adjacent power transmission coils, a magnetic flux density on the placing portion can be made substantially uniform and the power receiving device can be charged regardless of at which position of the placing portion the power receiving device is placed.

(8) It is preferable that the respective power transmission coils are of the same size and the centers thereof are arranged at vertices of a right triangular mesh; and that the oscillator causes currents of three phases shifted from each other by 120° to flow into three power transmission coils arranged at the respective vertices of a right triangle to which the power transmission coil arranged below the placed position determined by the determiner belongs.

According to this construction, since the power transmission coils are so arranged as to locate the centers thereof at the vertices of the right triangular mesh, clearances between the power transmission coils can be reduced. Further, since the currents of three phases shifted from each other by 120° flow into the three power transmission coils located at the vertices of the right triangle to which the power transmission coil arranged below the placed position of the power receiving device belongs, magnetic flux densities at the centers of gravity of the respective right triangles can be made uniform.

(9) It is preferable that the respective power transmission coils are of the same size and the centers thereof are arranged at vertices of a right triangular mesh; and that the oscillator causes currents whose frequencies are at a ratio of 1:m:n (m, n>0) to flow into three power transmission coils arranged at the respective vertices of a right triangle to which the power transmission coil arranged below the placed position determined by the determiner belongs.

According to this construction, since the power transmission coils are so arranged as to locate the centers thereof at the vertices of the right triangular mesh, clearances between the power transmission coils can be reduced. Further, since the currents whose frequencies are at the ratio of 1:m:n flow into the three power transmission coils located at the vertices of the right triangle to which the power transmission coil arranged below the placed position of the power receiving device belongs, magnetic flux densities at the centers of gravity of the respective right triangles can be made uniform.

(10) It is preferable that the respective power transmission coils are of the same size and the centers thereof are arranged at vertices of a right triangular mesh; and that the oscillator causes currents whose magnitudes are at a ratio of 1:m:n (m, n>0) to flow into three power transmission coils arranged at the respective vertices of a right triangle to which the power transmission coil arranged below the placed position determined by the determiner belongs.

According to this construction, since the power transmission coils are so arranged as to locate the centers thereof at the vertices of the right triangular mesh, clearances between the power transmission coils can be reduced. Further, since the currents whose magnitudes are at the ratio of 1:m:n flow into the three power transmission coils located at the vertices of the right triangle to which the power transmission coil arranged below the placed position of the power receiving device belongs, magnetic flux densities at the centers of gravity of the respective right triangles can be made uniform.

(11) The oscillator preferably intermittently oscillates the power transmission coils other than those to be oscillated.

According to this construction, since the power transmission coils other than those to be oscillated are intermittently oscillated, even if, for example, another power receiving device is placed on the placing portion right above the power transmission coils other than those to be oscillated, the placed position of this power receiving device can be detected. In other words, if the oscillation of the power transmission coils other than those to be oscillated is completely stopped, it cannot be detected that another power receiving device has been placed anew. However, by intermittently oscillating the above power transmission coils, whether or not a power receiving device has been placed can be detected and this power receiving device can be charged if being detected.

(12) The detector preferably detects the inductances of the respective power transmission coils based on the voltages of the respective power transmission coils.

According to this construction, the placed position of the power receiving device can be detected by a simple construction since the inductances of the respective power transmission coils are detected based on the voltages of the respective power transmission coils.

(13) The detector is preferably constructed by a plurality of feedback coils corresponding to the respective power transmission coils and magnetically coupled to the respective power transmission coils and detects the inductances of the respective power transmission coils based on the voltages of the respective feedback coils.

According to this construction, since the plurality of feedback coils magnetically coupled to the respective power transmission coils are provided, circuits elements with low pressure resistance can be used as those constructing the detector and cost can be reduced.

(14) The determiner preferably sets weighting values for the respective power transmission coils such that the weighting values for the respective power transmission coils increase as the voltages of the respective power transmission coils decrease and determines the placed position based on the set weighting values.

According to this construction, since the voltages of the power transmission coils decrease as distances to the power receiving coil get shorter, whether or not the power receiving device is placed right above the respective power transmission coils can be determined based on the set weighting values and the size of the placed power receiving device can be determined from the number of the successive power transmission coils having large weighting values set therefor by setting the weighting values for the respective power transmission coils based on the voltages of the respective power transmission coils.

(15) The respective power transmission coils are preferably so arranged in a layered manner as to displace the centers thereof from each other.

According to this construction, magnetic flux densities at the respective positions of the placing portion can be more reliably made constant.

(16) The oscillator preferably intermittently oscillates all the power transmission coils when the determiner determines that no power receiving device is placed on the placing portion.

According to this construction, since the respective power transmission coils are intermittently oscillated when no power receiving device is placed on the placing portion, it is possible to reduce standby power and, simultaneously, to detect the placement of the power receiving device.

(17) The power transmission coils are preferably larger in size than the power receiving coil.

According to this construction, even if a small power receiving device such as an electric toothbrush is adopted as the power receiving device, power can be transmitted regardless of the placed position of the power receiving device.

(18) The power receiving device preferably includes a secondary battery to be charged by power received by the power receiving coil, a rectifying circuit for rectifying and smoothing a current received by the power receiving coil, a switching element for turning on and off a connection between the rectifying circuit and the secondary battery, and a controller for controlling the switching element so that a current supplied to the secondary battery becomes constant.

According to this construction, the secondary battery of the power receiving device can be charged with a constant current.

(19) It is preferable that the determiner determines the size of the power receiving device placed on the placing portion according to the weighting values set for the respective power transmission coils; and that the oscillator changes power to be transmitted to the power receiving device according to the size of the power receiving device determined by the determiner.

According to this construction, it is possible to transmit more power to a large power receiving device and transmit less power to a small power receiving device, wherefore power can be efficiently transmitted to the power receiving device.

(20) The determiner preferably determines the sizes of respective power receiving devices based on the weighting values when a plurality of power receiving devices are placed on the placing portion.

According to this construction, suitable powers can be transmitted to the respective power receiving devices according to the sizes of the respective power receiving devices even if a plurality of power receiving devices are placed.

This application is based on Japanese Patent Application Serial Nos. 2009-015988 and 2009-150586, filed in Japan Patent Office on Jan. 27, 2009 and Jun. 25, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A contactless power transmission system, comprising a power transmitting device including power transmission coils for transmitting power, and a power receiving device including a power receiving coil to be magnetically coupled to the power transmission coils, wherein
the power transmitting device includes:
a placing portion, on which the power receiving device is to be placed,
a plurality of power transmission coils arranged below the placing portion,
an oscillator for oscillating respective power transmission coils while separately exciting the power transmission coils,
a detector for detecting inductances of the respective power transmission coils, and
a determiner for determining a placed position of the power receiving device on the placing portion based on the inductances of the respective power transmission coils detected by the detector; and
the oscillator specifies a plurality of power transmission coils to be oscillated based on the placed position determined by the determiner and sets parameters of currents to flow into the respective power transmission coils so as to mutually shift waveforms of the currents to flow into the plurality of specified power transmission coils,
wherein the oscillator specifies the plurality of power transmission coils to be oscillated based on the placed position determined by the determiner and mutually shifts the phases of the currents to flow into the plurality of specified power transmission coils.

2. A contactless power transmission system, comprising a power transmitting device including power transmission coils for transmitting power, and a power receiving device including a power receiving coil to be magnetically coupled to the power transmission coils, wherein
the power transmitting device includes:
a placing portion, on which the power receiving device is to be placed,
a plurality of power transmission coils arranged below the placing portion,
an oscillator for oscillating respective power transmission coils while separately exciting the power transmission coils,
a detector for detecting inductances of the respective power transmission coils, and
a determiner for determining a placed position of the power receiving device on the placing portion based on the inductances of the respective power transmission coils detected by the detector; and
the oscillator specifies a plurality of power transmission coils to be oscillated based on the placed position determined by the determiner and sets parameters of currents to flow into the respective power transmission coils so as to mutually shift waveforms of the currents to flow into the plurality of specified power transmission coils,
wherein the oscillator specifies the plurality of power transmission coils to be oscillated based on the placed position determined by the determiner and changes the frequencies of the currents to flow into the plurality of specified power transmission coils.

3. A contactless power transmission system, comprising a power transmitting device including power transmission coils for transmitting power, and a power receiving device including a power receiving coil to be magnetically coupled to the power transmission coils, wherein
the power transmitting device includes:
a placing portion, on which the power receiving device is to be placed,
a plurality of power transmission coils arranged below the placing portion,
an oscillator for oscillating respective power transmission coils while separately exciting the power transmission coils,
a detector for detecting inductances of the respective power transmission coils, and
a determiner for determining a placed position of the power receiving device on the placing portion based on the inductances of the respective power transmission coils detected by the detector; and
the oscillator specifies a plurality of power transmission coils to be oscillated based on the placed position determined by the determiner and sets parameters of currents to flow into the respective power transmission coils so as to mutually shift waveforms of the currents to flow into the plurality of specified power transmission coils, wherein the oscillator specifies the plurality of power transmission coils to be oscillated based on the placed position determined by the determiner and changes the magnitudes of the currents to flow into the plurality of specified power transmission coils.

4. A contactless power transmission system according to claim 1, wherein:
the plurality of power transmission coils are arranged in a reticular pattern; and
the oscillator causes currents of two phases shifted from each other by 90° to flow into adjacent ones of the plurality of power transmission coils to be oscillated.

5. A contactless power transmission system according to claim 2, wherein:
the plurality of power transmission coils are arranged in a reticular pattern; and
the oscillator causes different currents whose frequencies are at a ratio of 1:m (m>0) to flow into adjacent ones of the plurality of power transmission coils to be oscillated.

6. A contactless power transmission system according to claim 3, wherein:
the plurality of power transmission coils are arranged in a reticular pattern; and
the oscillator causes different currents whose magnitudes are at a ratio of 1:m (m>0) to flow into adjacent ones of the plurality of power transmission coils to be oscillated.

7. A contactless power transmission system according to claim 1, wherein:
the respective power transmission coils are of a same size and centers thereof are arranged at vertices of a right triangular mesh; and
the oscillator causes currents of three phases shifted from each other by 120° to flow into three power transmission coils arranged at respective vertices of a right triangle to which a power transmission coil arranged below the placed position determined by the determiner belongs.

8. A contactless power transmission system according to claim 2, wherein:
the respective power transmission coils are of a same size and centers thereof are arranged at vertices of a right triangular mesh; and
the oscillator causes currents whose frequencies are at a ratio of 1:m:n (m, n>0) to flow into three power transmission coils arranged at the respective vertices of a right triangle to which a power transmission coil arranged below the placed position determined by the determiner belongs.

9. A contactless power transmission system according to claim 3, wherein:
the respective power transmission coils are of a same size and centers thereof are arranged at vertices of a right triangular mesh; and
the oscillator causes currents whose magnitudes are at a ratio of 1:m:n (m, n>0) to flow into three power transmission coils arranged at respective vertices of a right triangle to which a power transmission coil arranged below the placed position determined by the determiner belongs.

10. A contactless power transmission system according to claim 1, wherein the oscillator intermittently oscillates the power transmission coils other than the power transmission coils to be oscillated.

11. A contactless power transmission system according to claim 1, wherein the detector detects the inductances of the respective power transmission coils based on the voltages of the respective power transmission coils.

12. A contactless power transmission system according to claim 1, wherein the detector is constructed by a plurality of feedback coils corresponding to the respective power transmission coils and magnetically coupled to the respective power transmission coils and detects the inductances of the respective power transmission coils based on voltages of the respective feedback coils.

13. A contactless power transmission system, comprising a power transmitting device including power transmission coils for transmitting power, and a power receiving device including a power receiving coil to be magnetically coupled to the power transmission coils,
wherein
the power transmitting device includes:
a placing portion, on which the power receiving device is to be placed,
a plurality of power transmission coils arranged below the placing portion,
an oscillator for oscillating respective power transmission coils while separately exciting the power transmission coils,
a detector for detecting inductances of the respective power transmission coils, and
a determiner for determining a placed position of the power receiving device on the placing portion based on the inductances of the respective power transmission coils detected by the detector; and
the oscillator specifies a plurality of power transmission coils to be oscillated based on the placed position determined by the determiner and sets parameters of currents to flow into the respective power transmission coils so as to mutually shift waveforms of the currents to flow into the plurality of specified power transmission coils,
wherein the determiner sets weighting values for the respective power transmission coils such that the weighting values for the respective power transmission coils increase as voltages of the respective power transmission coils decrease and determines the placed position based on the set weighting values.

14. A contactless power transmission system according to claim 1, wherein the respective power transmission coils are arranged in a layered manner as to displace centers thereof from each other.

15. A contactless power transmission system according to claim 1, wherein the oscillator intermittently oscillates all of the power transmission coils when the determiner determines that no power receiving device is placed on the placing portion.

16. A contactless power transmission system according to claim 1, wherein the power transmission coils are larger in size than the power receiving coil.

17. A contactless power transmission system according to claim 1, wherein the power receiving device includes:
a secondary battery to be charged by power received by the power receiving coil,
a rectifying circuit for rectifying and smoothing a current received by the power receiving coil,
a switching element for turning on and off a connection between the rectifying circuit and the secondary battery, and
a controller for controlling the switching element so that a current supplied to the secondary battery becomes constant.

18. A contactless power transmission system according to claim 13, wherein:

the determiner determines a size of the power receiving device placed on the placing portion according to the weighting values set for the respective power transmission coils; and the oscillator changes power to be transmitted to the power receiving device according to the size of the power receiving device determined by the determiner.

19. A contactless power transmission system according to claim 18, wherein the determiner determines sizes of respective power receiving devices based on the weighting values when a plurality of power receiving devices are placed on the placing portion.

* * * * *